US 11,410,784 B2

(12) United States Patent
Singh

(10) Patent No.: US 11,410,784 B2
(45) Date of Patent: Aug. 9, 2022

(54) PASSIVE COOLING DEVICE FOR CASKS CONTAINING NUCLEAR FUEL

(71) Applicant: Holtec International, Camden, NJ (US)

(72) Inventor: Krishna P. Singh, Jupiter, FL (US)

(73) Assignee: HOLTEC INTERNATIONAL

( * ) Notice: Subject to any disclaimer, the term of this patent is extended or adjusted under 35 U.S.C. 154(b) by 282 days.

(21) Appl. No.: 16/779,908

(22) Filed: Feb. 3, 2020

(65) Prior Publication Data
US 2021/0280332 A1  Sep. 9, 2021

Related U.S. Application Data

(60) Provisional application No. 62/799,868, filed on Feb. 1, 2019.

(51) Int. Cl.
*G21F 5/10* (2006.01)
*G21C 13/02* (2006.01)
(Continued)

(52) U.S. Cl.
CPC ............. *G21F 5/10* (2013.01); *G21C 13/02* (2013.01); *G21C 19/07* (2013.01); *G21C 19/08* (2013.01);
(Continued)

(58) Field of Classification Search
CPC ... G21F 5/10; G21F 5/002; G21F 5/00; G21F 5/008; G21F 5/012; G21F 5/06;
(Continued)

(56) References Cited

U.S. PATENT DOCUMENTS 4,980,093 A * 12/1990 Ohtsuka ................ G21F 9/08
423/2
5,015,432 A * 5/1991 Koloc .................. H05H 1/52
376/148
(Continued)

FOREIGN PATENT DOCUMENTS

WO    WO2014/176289 A2    10/2014

OTHER PUBLICATIONS

International Search Report and Written Opinion for International Application No. PCT/US20/16330 dated Oct. 13, 2020.

*Primary Examiner* — Nicole M Ippolito
(74) *Attorney, Agent, or Firm* — The Belles Group, P.C.

(57) ABSTRACT

A system for externally cooling a cask containing heat-emitting spent nuclear fuel includes the cask comprising a radiation shielding body defining an internal cavity configured to hold a canister containing the spent nuclear fuel. A continuously annular cooling jacket extends circumferentially around an external surface of the cask body. The cooling jacket may have a double shell construction including an internal cavity for a cooling medium which provides an external heat sink for absorbing heat radiated from the external wall surface of the cask generated by the spent nuclear fuel. The heat emitted by the spent nuclear fuel is absorbed by the cooling medium in the cooling jacket, thereby in turn cooling the cask. In one embodiment, the cooling medium may be dry ice which undergoes sublimation by absorbing the heat to change from solid to gaseous phase directly. The jacket may be formed of multiple segments.

21 Claims, 34 Drawing Sheets

(51) Int. Cl.
*G21C 19/07* (2006.01)
*G21C 19/08* (2006.01)
*G21C 19/40* (2006.01)
*G21F 5/00* (2006.01)
*G21F 5/06* (2006.01)
*G21F 5/12* (2006.01)
*G21F 5/14* (2006.01)
*G21F 5/002* (2006.01)
*G21F 5/008* (2006.01)
*G21F 5/012* (2006.01)

(52) U.S. Cl.
CPC .............. *G21C 19/40* (2013.01); *G21F 5/00* (2013.01); *G21F 5/002* (2013.01); *G21F 5/008* (2013.01); *G21F 5/012* (2013.01); *G21F 5/06* (2013.01); *G21F 5/12* (2013.01); *G21F 5/14* (2013.01)

(58) Field of Classification Search
CPC .. G21F 5/12; G21F 5/14; G21C 13/02; G21C 149/07; G21C 19/08; G21C 19/40

USPC ......... 250/505.1, 506.1, 507.1, 515.1, 516.1, 250/517.1, 518.1, 519.1
See application file for complete search history.

(56) References Cited

U.S. PATENT DOCUMENTS

| | | | |
|---|---|---|---|
| 5,185,104 A * | 2/1993 | Horie | ................. G21F 9/32 423/2 |
| 6,234,244 B1 | 5/2001 | Morrison et al. | |
| 6,587,536 B1 | 7/2003 | Singh et al. | |
| 7,330,525 B2 | 2/2008 | Singh et al. | |
| 7,994,380 B2 | 8/2011 | Singh et al. | |
| 8,415,521 B2 | 4/2013 | Singh et al. | |
| 2013/0301781 A1* | 11/2013 | Parvin | ................ G21D 3/06 376/282 |
| 2015/0206610 A1 | 7/2015 | Carver et al. | |
| 2016/0040267 A1* | 2/2016 | Stoner | ................. G21G 1/001 204/157.21 |
| 2018/0322970 A1 | 11/2018 | Singh et al. | |
| 2020/0027612 A1 | 1/2020 | Singh | |

* cited by examiner

PASSIVE COOLING DEVICE FOR CASKS CONTAINING NUCLEAR FUEL

CROSS-REFERENCE TO RELATED APPLICATIONS

This application claims the benefit of U.S. Provisional Application No. 62/799,868 filed Feb. 1, 2019, which is incorporated herein by reference in its entirety.

BACKGROUND

The present invention relates generally to casks used to transport and store spent nuclear fuel created by nuclear generating plants or other facilities.

In the operation of nuclear reactors, the nuclear energy source is in the form of hollow Zircaloy tubes filled with enriched uranium (aka fuel rods), collectively arranged in assemblages referred to as fuel assemblies. Each fuel assembly contains a multitude of the packaged fuel rods. When the energy in the fuel assembly has been depleted to a certain predetermined level, the fuel assembly is removed from the nuclear reactor. The standard structure used to package used or spent nuclear fuel assemblies discharged from light water reactors for off-site shipment or on-site dry storage is known as the fuel basket. The fuel basket is essentially an assemblage of prismatic storage cells, each of which is sized to store one fuel assembly that comprises a plurality of individual spent nuclear fuel rods. The fuel basket is arranged inside a metallic storage canister (typically plain steel cylindrical walls), which in turn is placed inside a ventilated outer overpack or cask for safe transport and storage of the multiple spent fuel assemblies within the canister's inner fuel basket. The walls of the canister are therefore generally unshielded against radiation to minimize the outer diameter of the canister.

The spent nuclear fuel ("SNF") in the fuel assemblies within the canister is still highly radioactive and produces considerable heat which must be dissipated, in addition to concomitantly emitting dangerous ionizing neutron and gamma photons (i.e. neutron and gamma radiation) requiring protective shielding. Thus, caution must be exercised when the fuel assemblies are handled, transported, packaged and stored. The canisters are therefore placed inside an outer shielded transport/storage overpack or cask containing radiation shielding. Neutron radiation may be effectively attenuated with the outer storage and transport casks having metallic and polymeric shielding materials typically containing boron. These boron-containing materials however are not effective at attenuating and shielding gamma radiation emitted from the fuel stored in the fuel baskets. Effective gamma radiation shielding requires very dense materials, such as lead, steel, concrete, copper, and combinations thereof which are incorporated into the outer cask. One common cask configuration consists of concentrically arranged steel shells creating an annulus therebetween filled with these dense gamma-blocking materials in addition to neutron shielding materials. The casks which house the spent nuclear fuel canister are thus very heavy and large structures with thick walls, typically weighing about 150 tons, about 15 feet or more high/long, and about 6 feet in internal diameter.

A cask bearing fissile nuclear materials such as for example a "transfer cask" used to move used nuclear fuel from the fuel pool to a storage pad may be vulnerable to overheating of its contents, for example, because of its thick walls (required for radiation shielding) which may inhibit rejection of heat to the ambient. The same situation applies to a "storage cask" used to store the SNF in a "dry state" for long periods of time. A hard limit may be placed on the maximum temperature that the casks contents are permitted to reach. For example, the USNRC, through its Information Notice ISG-11 Rev. 3, limits the peak cladding temperature of used nuclear fuel to 400 Deg. C. For a cask with relatively small heat loads (e.g., below 20 kW), the natural convection from the cask's outer surface may be enough to maintain the temperature of the contents below the limit. However, if the heat load and/or the ambient temperature are high, then natural convection alone may not be sufficient. For such a case, it is necessary to provide an auxiliary means to augment heat rejection from the cask.

For nuclear applications, such an auxiliary cooling system or device should preferably meet the following three requirements. First, the system/device must not rely on any active system such as pump or a blower which makes it vulnerable to loss of electric power. Second, the system/device must be substantially immune to malfunction due to human performance errors. For example, the device should not introduce the risk of a new type of accident. And third, to minimize radiation dosage to the crew or personnel, the system/device should not require the workers to be physically close to the cask for extended periods of time.

Improvements in cooling of casks used to both store and transport spent nuclear fuel which meet the foregoing criteria are needed.

BRIEF SUMMARY

The present application discloses a cooling system for externally cooling a nuclear fuel cask (transport or storage) which overcomes the foregoing problems. In one embodiment, the cooling system comprises a cooling sleeve or jacket is provided which is mounted around and surrounds the exterior of the cask. The cooling jacket may have an annular cylindrical shape in one embodiment which is complementary to the cylindrical shape of cask. The cooling jacket extends circumferentially around the exterior of the cask preferably for a full 360 degrees when disposed on the cask in one embodiment. The jacket may be provided as single prefabricated circular assembly or unit which can be slipped over the end of the cask, or alternatively may be provided as multiple sections or segments which may be assembled together after emplacement laterally around the cask to completely enclose the sides of the cask.

In one embodiment, the cooling jacket may comprise a double shelled or walled structure defining a hollow inter-shell cooling medium cavity between its inner and outer cylindrical shell walls that is configured to hold a cooling medium. Preferably, a sublimating type cooling medium which exists as a solid at normal atmospheric pressure is used which changes phase directly to a gaseous phase by absorbing heat generated by the cask. In one preferred embodiment, the sublimating cooling medium may be for example dry ice (solid carbon dioxide). The dry ice may partially or completely fill the cavity depending on the degree of cask cooling required and energy/heat still generated by the SNF therein. The dry ice may be provided in any suitable solid form, such as for example without limitation pellets or blocks.

The cooling jacket may be maintained at a pre-set distance or spacing from the cylindrical external or outer surface of the cask by spacers. The spacers maintain a uniform annular radial interstitial gap or space between the cask and jacket, which preferably remains empty and air-filled. Externally radiated and convected heat emitted from the cask travels across the empty interstitial space to the cooling jacket wherein it is absorbed by the dry ice therein, which comes heated via the inherently endothermic sublimation process, as further described herein. The heated dry ice rejects the heat in turn to the ambient environment or atmosphere via sublimation as non-toxic gaseous carbon dioxide which is vented from the cooling jacket.

Accordingly, the dry ice inside the cooling jacket acts as a cooler external heat sink to absorb the heat emitted by the cask in a manner more efficient than the ambient air surrounding the cask or other known methods like water cooling. The cooling effectiveness of the external cooling jacket surrounding the cask and dry ice advantageously are unaffected by prevailing ambient temperatures which change with the seasons and time of day. This allows more uniform cask temperatures to be predicted and maintained based on the amount of heat emitted by the cask dependent upon the cask heat load, and is particularly well-suited for warmer climates with higher prevailing ambient temperatures which make either air or water cooling less efficient.

The cooling jacket may be configured to slideably fit over and around the cask, and remains in place without need for any permanent or temporary mechanical coupling or fastening directly to the cask (e.g. welding, soldering, brazing, threaded fasteners, etc.).

The present external jacketed cooling system is suitable for application to a transfer cask used to temporarily move and stage the canister holding the spent nuclear fuel (SNF) assemblies, or for use with a longer term dry storage cask when additional cooling may be needed for a relatively short period of time. More broadly, it will be appreciated that the present jacketed cooling system may be used with any type of container used to house or contain spent nuclear fuel. This includes not only radiation shielded outer overpacks or cask, but also unshielded nuclear canisters such as multi-purpose canisters (MPCs) available from Holtec International of Camden, N.J. which are placed inside such casks. Accordingly, the term "container" used herein shall be broadly construed to cover any type of container which may form a sealed fluidic containment boundary to hold radioactive spent nuclear fuel and/or irradiated nuclear debris/waste materials associated with operation of the nuclear reactor.

In other possible embodiments, the cooling jacket may form an integral and non-separable/non-detachable part of the cask body. Various such constructions are also disclosed herein.

According to one aspect, a system for cooling high level radioactive waste comprises: a cask comprising a storage cavity containing the high level radioactive waste emitting heat; and a cooling jacket at least partially surrounding the cask, the cooling jacket comprising a cooling medium cavity containing a cooling medium that sublimates at normal atmospheric pressure, the cooling medium providing an external heat sink for absorbing the heat emitted from the cask from the high level radioactive waste.

According to another aspect, a system for cooling high level radioactive waste comprises: a cask having a body defining a storage cavity containing the high level radioactive waste; a cooling jacket comprising: an inner shell; an outer shell surrounding the inner shell so that a cooling medium cavity is formed between the inner shell and the outer shell; a cooling medium disposed in the cooling medium cavity; and a central interior space defined by the inner shell; the cask positioned at least partially within the central interior space of the cooling jacket so that an interstitial space is formed between the inner shell of the cooling jacket and the cask.

According to another aspect, a method for cooling high level radioactive waste comprises: circumferentially surrounding at least a portion of a cask containing the high level radioactive waste emitting heat with a cooling jacket, the cooling jacket containing a cooling medium that sublimates at normal atmospheric pressure; and wherein at least a portion of the heat emitted by the high level radioactive waste that exits the cask is absorbed by the cooling jacket.

According to another aspect, a method for cooling a horizontally-oriented cask containing high level radioactive waste emitting heat comprises: (a) lowering a cooling jacket having an arcuately curved shape over the horizontally-oriented cask to at least partially surround a top portion of the cask, the cooling jacket containing a cooling medium in a first phase, the cooling medium changing from a first phase to a second phase at normal atmospheric pressure and normal temperature; and (b) absorbing the heat emitted by the high level radioactive waste that exits the cask with the cooling jacket; wherein the cooling medium changes from the first phase to the second phase during step (b).

According to another aspect, a cooling jacket for cooling a cask containing high level radioactive waste emitting heat comprises: a horizontally elongated body having an arcuate shape, the body including an inner shell, and outer shell, and a cooling medium cavity formed between the shells; a central interior space defined by an inner surface of the inner shell that is configured for receiving the cask at least partially therein; a cooling medium in a first phase disposed in the cooling medium cavity, the cooling medium changing from a first phase to a second phase at normal atmospheric pressure and normal temperature, the cooling medium providing an external heat sink for absorbing the heat emitted by the high level radioactive waste that exits the cask; and wherein the cooling medium upon absorbing the heat that exists the cask undergoes an endothermic phase transition from the first phase to the second phase.

According to another aspect, a system for cooling spent nuclear fuel comprises: a cask comprising a storage cavity configured to hold the spent nuclear fuel; and a cooling jacket at least partially surrounding the cask, the cooling jacket comprising a cooling medium in a first phase and that changes from the first phase to a second phase at normal atmospheric pressure and normal temperature.

According to another aspect, a system for storing and/or transporting high level radioactive waste emitting heat comprises: a hermetically sealed canister containing the high level radioactive waste; and a cask comprising a cask body defining a storage cavity, the canister positioned within the storage cavity, and the cask body comprising one or more cooling medium cavities containing a cooling medium in a first phase, the cooling medium changing from the first phase to a second phase at normal atmospheric pressure and normal temperature.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein like elements are labeled similarly and in which.

Figure 1:
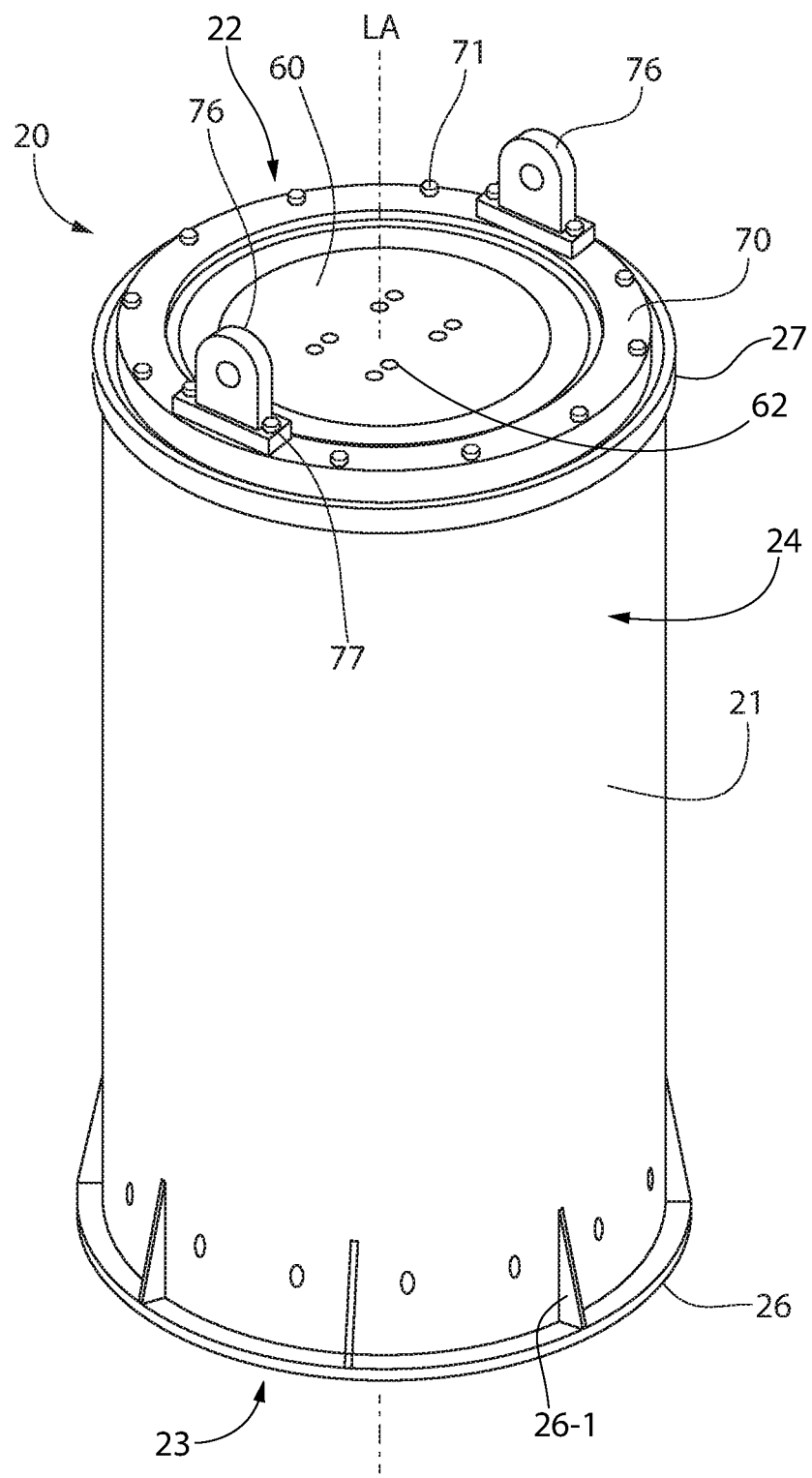
FIG. 1 is a perspective view of a cask for storage and transport of high level nuclear waste such as without limitation spent nuclear fuel having an outer neutron shield cylinder (NSC) and a separable detachable inner gamma blocker cylinder (GBC) nested therein.

All drawings are schematic and not necessarily to scale. Features shown numbered in certain figures are the same features which may appear un-numbered in other figures unless noted otherwise herein.

DETAILED DESCRIPTION

The features and benefits of the invention are illustrated and described herein by reference to exemplary (i.e. "example") embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

For non-limiting exemplary purposes, the cask cooling system and related methods discussed herein will be described in connection with storage and/or transport casks used to the transport, store and handle spent nuclear fuel ("SNF"). However, the invention is not limited in its applicability to casks handling SNF alone, and can be utilized to cool casks emitting heat used to handle any type of high level nuclear waste, including for example without limitation without limitation burnable poison rod assemblies ("BPRA"), thimble plug devices ("TPD"), control rod assemblies ("CRA"), axial power shaping rods ("APSR"), wet annular burnable absorbers ("WABA"), rod cluster control assemblies ("RCCA"), control element assemblies ("CEA"), water displacement guide tube plugs, orifice rod assemblies, vibration suppressor inserts and any other radioactive materials. The SNF and foregoing waste materials may collectively be referred to as "nuclear waste" herein all of which are radioactive. Moreover, while this invention is focused on cooling of casks containing high level nuclear waste, it can be applied to cool any type of nuclear-related or non-nuclear vessels with heat producing contents that need to be kept cool for operational reasons.

Figure 2:
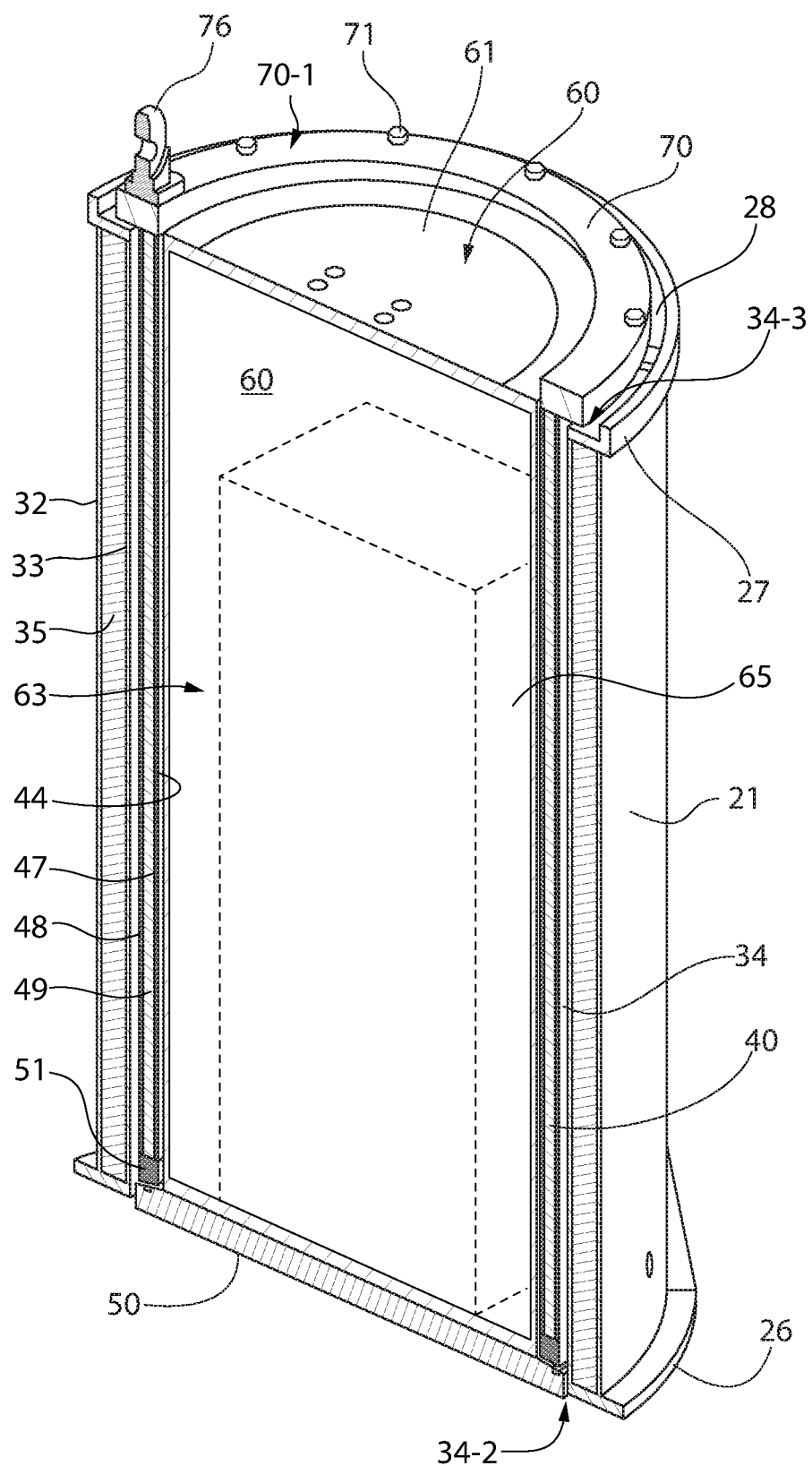
FIG. 2 is a partial cross-sectional view thereof.

FIGS. 1 and 2 show one non-limiting embodiment of a vertically oriented cask 20 containing spent nuclear fuel (SNF) which may utilize an external cooling system according to the present disclosure. However, the present cooling system can be used with a cask in other orientations such as casks in a horizontal or inclined orientation. The heat extraction effectiveness of the cask cooling system may be influenced by the orientation of the cask, but the present invention is equally applicable to such alternate orientations. An embodiment of the cask cooling system for horizontally orientated nuclear fuel storage/transport casks is disclosed later herein.

Referring now to FIGS. 1-2 and 16-17, cask 20 may be an elongated vessel having a cylindrical body defining a longitudinal axis LA. Cask 20 includes a top end 22, a bottom end 23, cylindrical sidewall 24 extending between the ends and defining an outer or external surface of the cask, and an internal longitudinal storage cavity 44. Cavity 44 extends for substantially a full height of the cask along the longitudinal axis from the top to bottom end. Cavity 44 is configured to hold and support a conventional nuclear spent fuel (SNF) canister 60 therein. Canister 60 may be a multi-purpose canister (MPC) such as those available from Holtec International of Camden, N.J. The cavity 44 of cask 20 preferably has a transverse cross-sectional area configured to hold no more than a single spent nuclear fuel canister 60, which in turn defines an internal storage cavity 65 of its own that holds a plurality of conventional SNF assemblies 63 each of which contain multiple fuel rods. The fuel assemblies 63 are represented schematically in FIG. 2 by hatching as such assemblies are well known in the art. Canister 60 includes a cylindrical body and a sealable lid 61 to close cavity 65 and provide access to the interior of the canister and fuel assemblies 63 stored therein. A typical nuclear fuel canister may hold approximately 89 fuel assemblies at full capacity. A plurality of vent holes 62 may be formed in lid 61 to allow the escape of heated air from the canister 60 created by the decay heat emitted by the SNF stored therein.

The cask 20 may have a composite wall construction and be comprised of an outer neutron shield cylinder (NSC) 21 and a concentrically arranged inner gamma blocker cylinder (GBC) 40 nested therein as shown. Such a construction is shown in commonly owned pending U.S. application Ser. No. 16/434,620 filed Jun. 7, 2019, which is incorporated herein by reference in its entirety. In one embodiment, the inner cylinder may be detachably and removably positioned and inserted inside the outer cylinder. The inner GBC 40 may have a composite wall construction including an inner cylindrical shell 47 and outer cylindrical shell 48 with a gamma blocking liner 49 interposed and sandwiched therebetween. GBC 40 defines cavity 44 of the cask 20 for holding the nuclear fuel canister 60. The outer NSC 21 may similarly have a composite wall construction including an inner cylindrical shell 33 and outer cylindrical shell 32 with a neutron attenuation shielding media 35 sandwiched therebetween. The shells may be formed of a suitable metal of sufficient structural strength and thickness such as without limitation stainless steel for corrosion protection.

A cooling air ventilation annulus 34 may be formed between the inner and outer cylinders 40, 21 of cask 20 to provide natural convective cooling of the cask and assist with dissipating the heat produced by the decaying nuclear fuel inside canister 60 in conjunction with the present cask cooling system. An annular lower cooling air inlet opening 34-2 into the air ventilation annulus 34 is provided between the cylinders 40, 21 at the bottom of the cask to draw and introduce ambient cooling air into the annulus. Similarly, an annular upper cooling air outlet opening 34-3 is provided between the cylinders at the top of the cask to vent the heated air rising up in annulus 34 via natural convection to atmosphere.

Although the illustrated cask 20 is shown as comprising a detachable double cylinder construction with both a neutron attenuation shielding media 35 and a gamma blocking liner 49 housed in separate cylinders, the cask cooling system disclosed herein is not limited to such an application alone. According, the cooling system may be used with single cylinder cask constructions having neutron shielding and/or gamma blocking materials embedded between its inner and outer shells without being separable cylinders.

The gamma blocking liner 49 in GBC 40 may be preferably constructed of a high density and high thermally conductive metallic material(s) selected and operable to block gamma radiation. Suitable materials which may be used that meet those criteria include steel, lead, or copper as some non-limiting examples. In one embodiment, the liner 49 may comprise lead. The neutron shielding media 35 in NSC 21 may be a boron-containing material for neutron attenuation. In one embodiment, the neutron shielding may be a solid material such as Holtite™ available from Holtec International of Camden, N.J. which is formulation comprising hydrogen rich polymer impregnated with uniformly dispersed boron carbide particles. Other boron containing materials may be used. In other embodiments, the neutron shielding media 35 may be liquid such as water containing boric acid. In either the case of a solid or liquid neutron shielding media, the media may be completely enclosed or encased between the shells.

The bottom end 23 of neutron shield cylinder 21 may include a gusseted annular bottom support flange 26 for support of the NSC and cask 20 during transport and stiffening of the sidewall 24 of the cylinder. The flange 26 may extend radially outwards beyond the outer shell 32 of the outer NSC 21 and circumferentially completely around the cask. Vertical gusset plates 26-1 spaced circumferentially apart around the flange are welded to the top of the flange and adjoining lower portions of the outer/external surface of the cylinder sidewall 24. In one embodiment, the gusset plates may have a triangular configuration defining an upwardly facing angled edge as shown (see also FIG. 17). The flange 26 is configured and arranged to engage a platform surrounding a receptacle of a self-propelled wheeled or tracked vertical cask transport vehicle or crawler used to transport the fully loaded cask 20 with loaded fuel canister, GBC, and NSC. Such cask transporters are well known in the art and commercially available from manufacturers such as Enerpac Heavy Lifting Technology and others. When the inner gamma block cylinder 40 loaded with a fuel canister 60 is mounted inside the outer NSC 21, the bottom end of the GBC projects downwards below support flange 26 into the upwardly open receptacle of the crawler and may not engage any structural surface of the transport vehicle for support. Accordingly, the bottom support flange 26 of the outer NSC supports the entire weight of the cask 20 and spent fuel therein.

The cavity 44 at the bottom end 42 of GBC 40 may be closed by a detachable bottom lid 50. Lid 50 protrudes vertically downwards below the bottom support flange 26 and bottom end 23 of the outer neutron shield cylinder 21 when the inner gamma block cylinder 40 is placed therein. The bottom lid 50 is constructed to support the spent fuel canister 60 which rests on the planar horizontal top surface of lid, which is of suitable thickness for this purpose without undue deflection from the weight of the canister.

Figure 17:
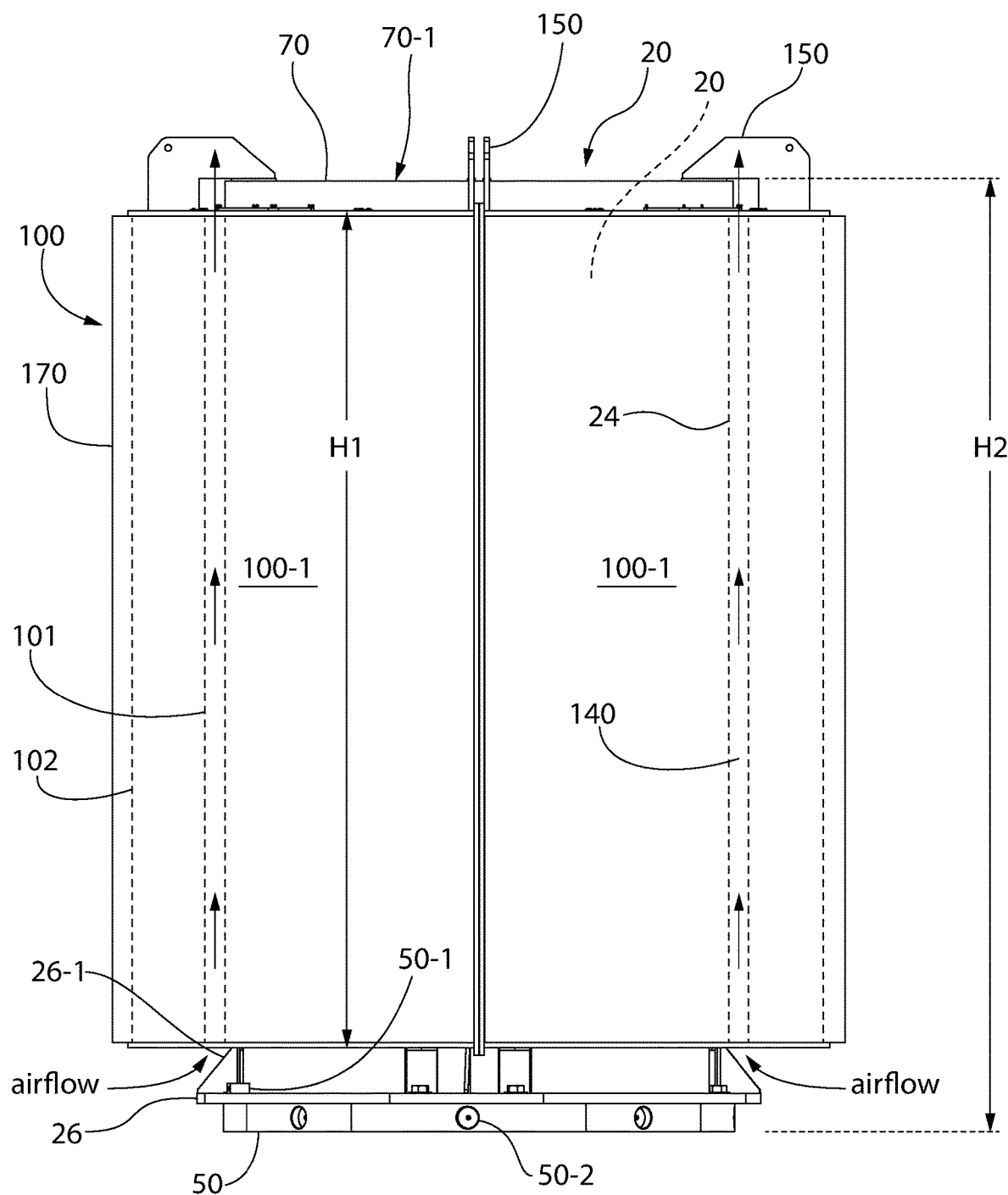
FIG. 17 is a side view thereof.
Figure 18:
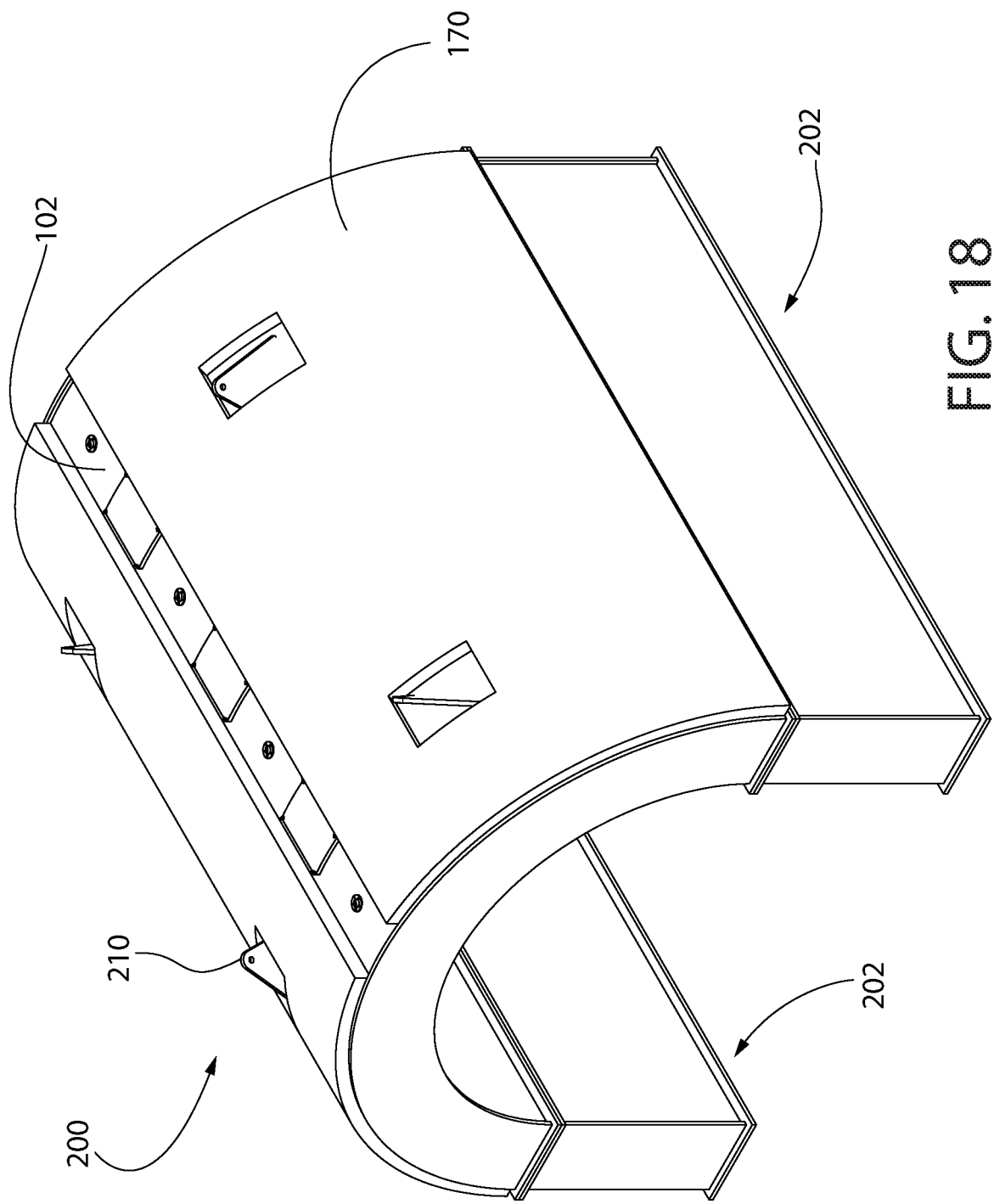
FIG. 18 is a top perspective view of a second embodiment of an external cooling jacket for use with the cask of FIGS. 1 and 2 in a horizontal orientation.
Figure 19:
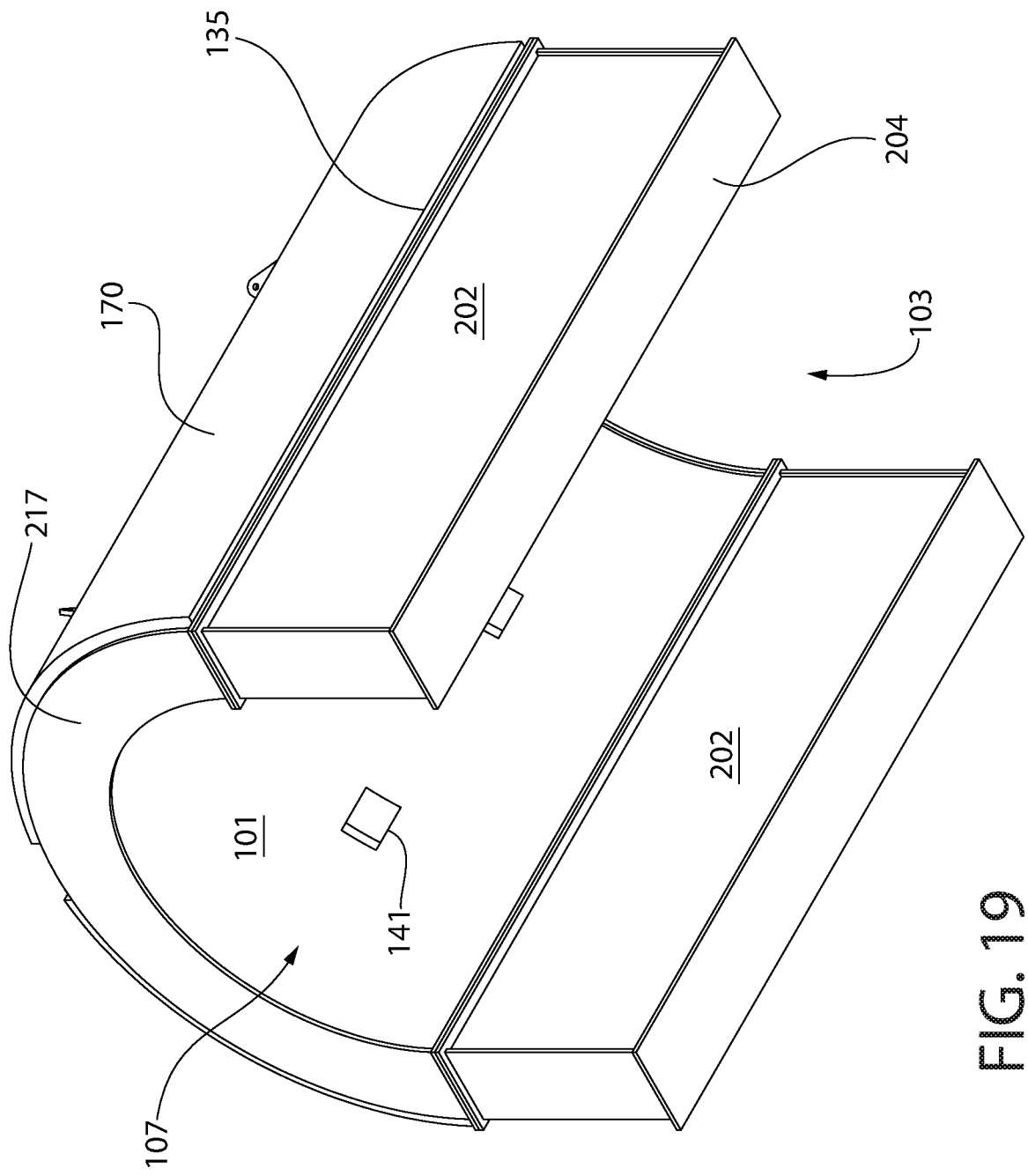
FIG. 19 is a bottom perspective view thereof.
Figure 20:
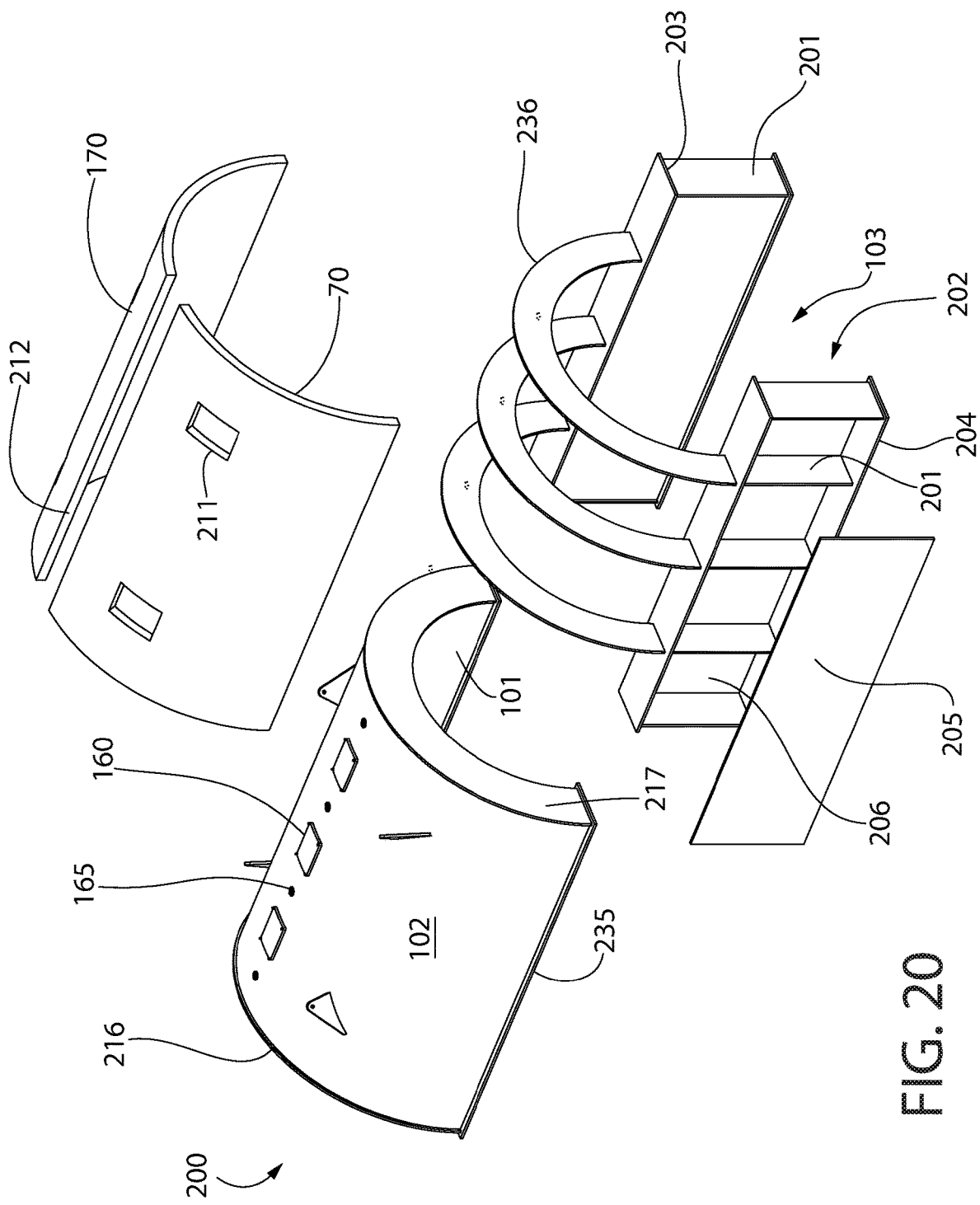
FIG. 20 is an exploded perspective view thereof.
Figure 21:
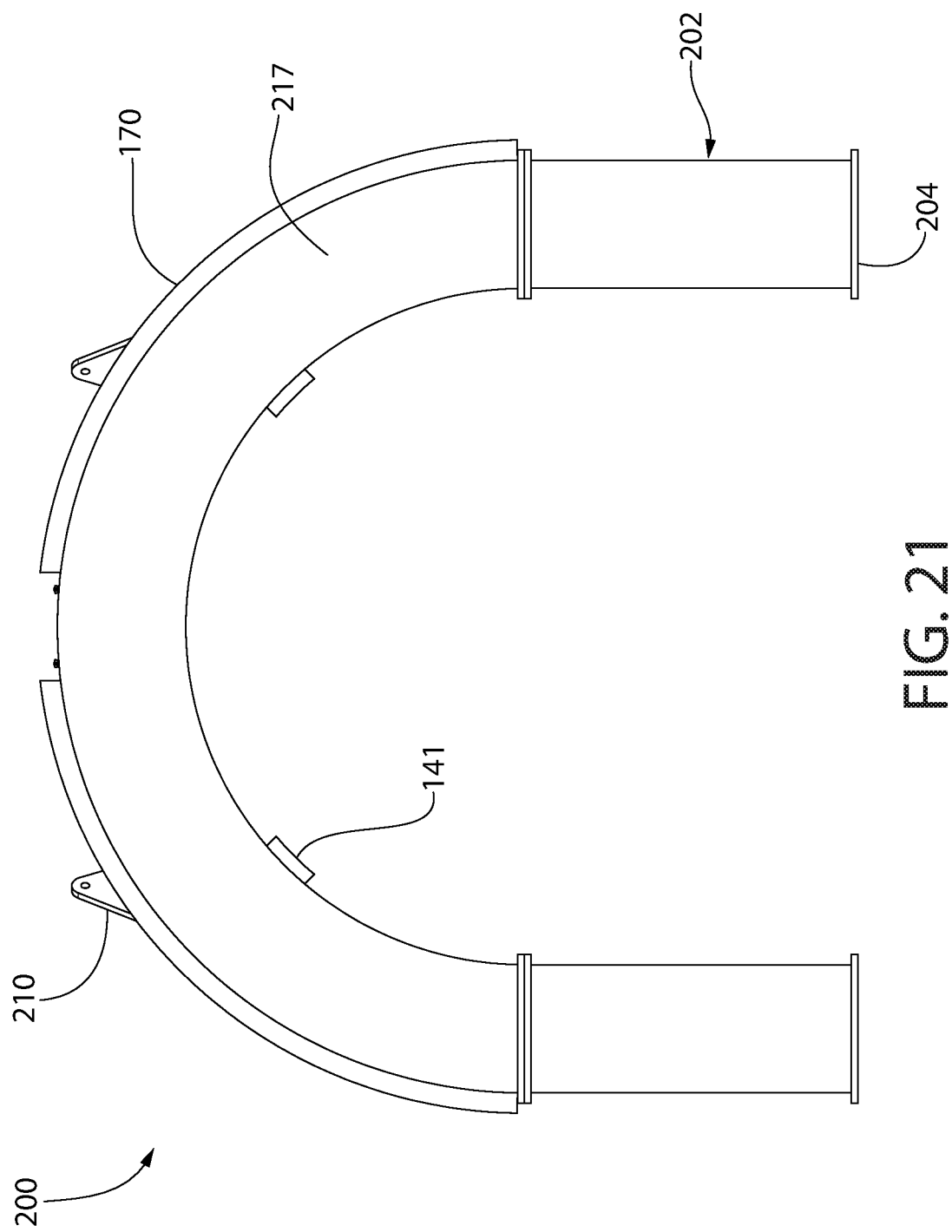
FIG. 21 is an end view thereof.
Figure 22:
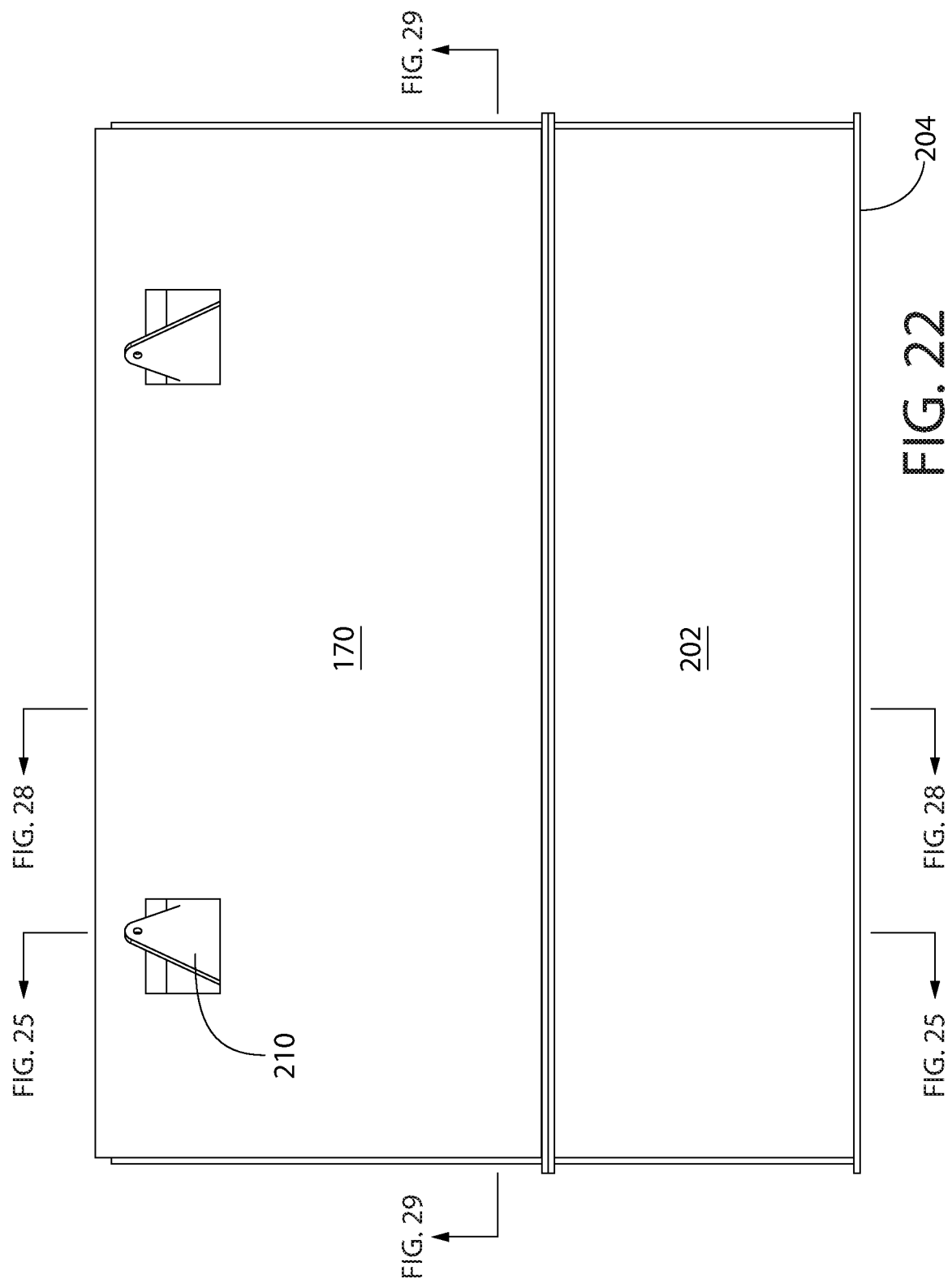
FIG. 22 is a side view thereof.
Figure 23:
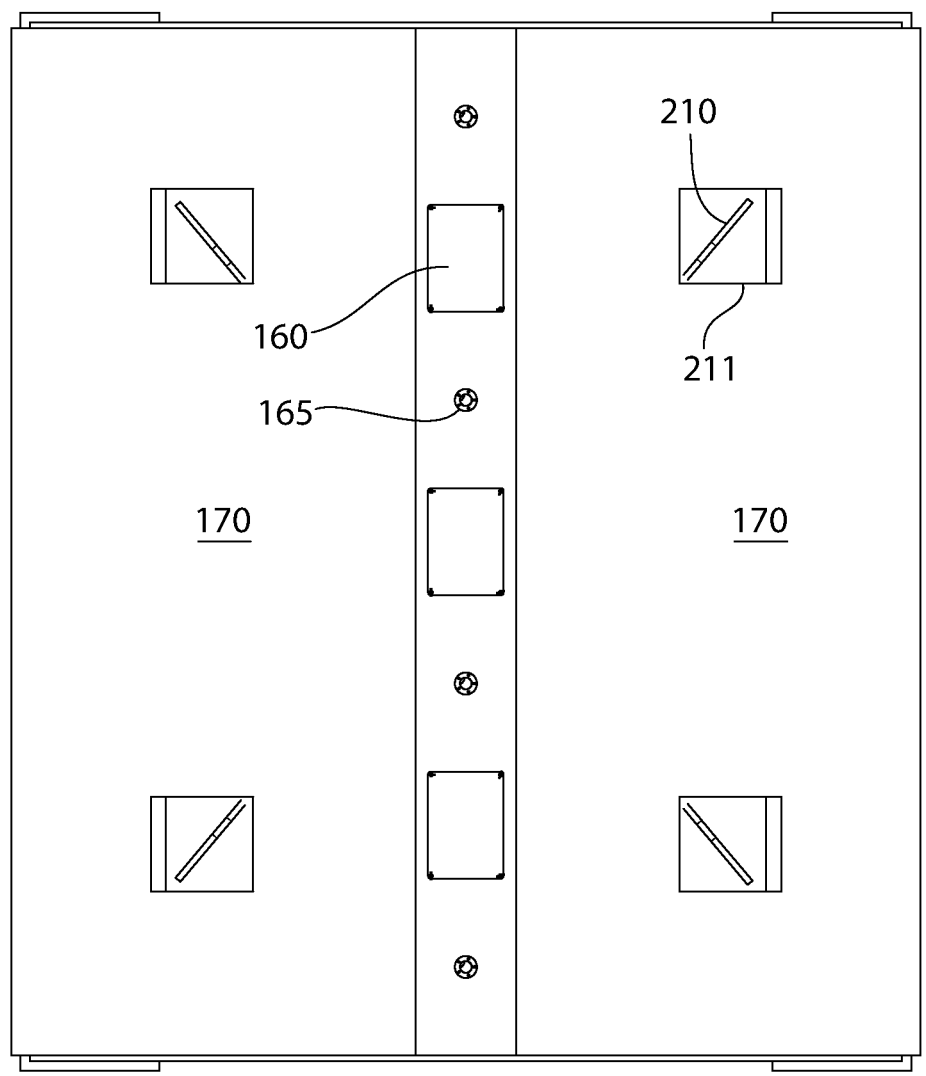
FIG. 23 is a top view thereof.
Figure 24:
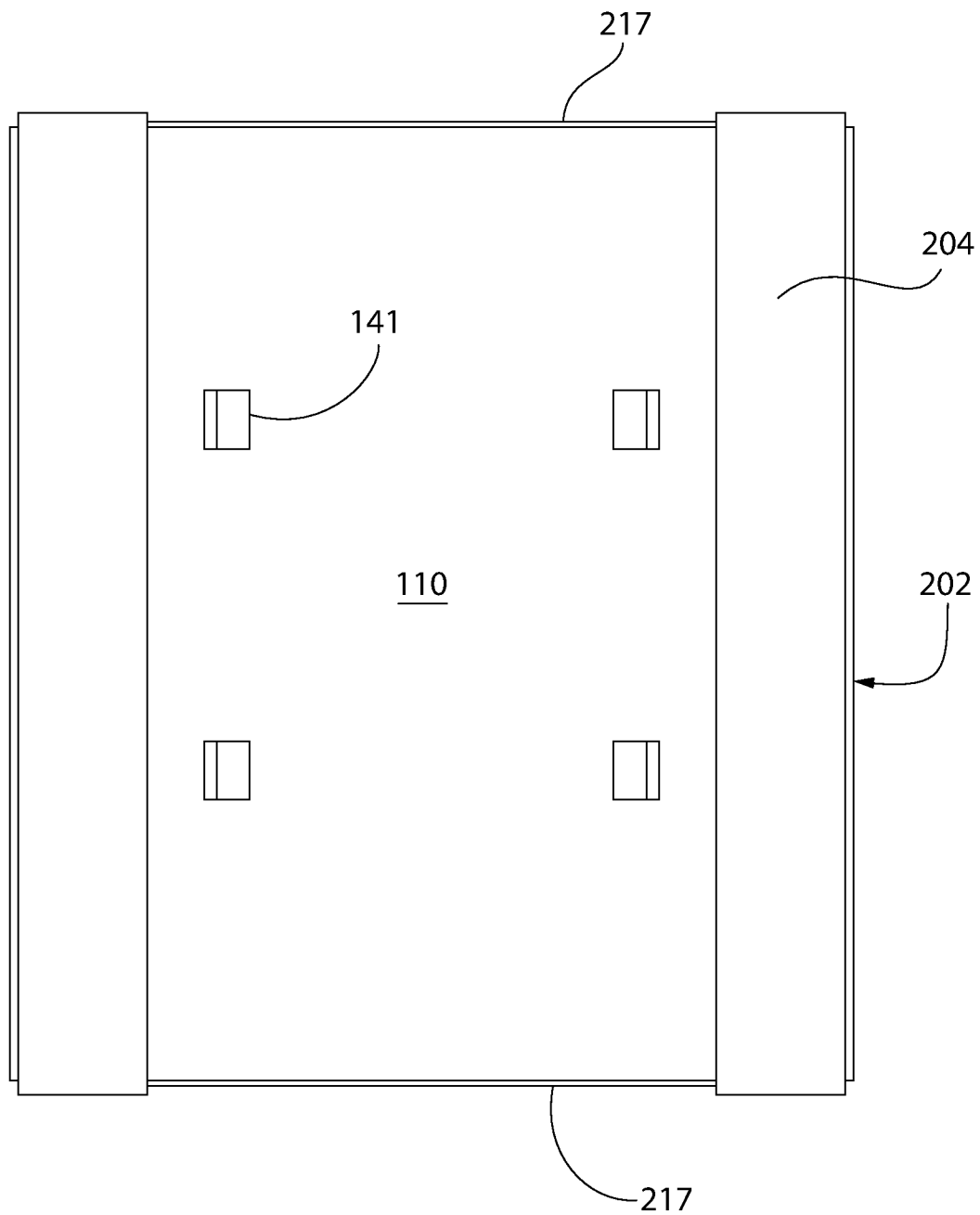
FIG. 24 is a bottom view thereof.
Figure 25:
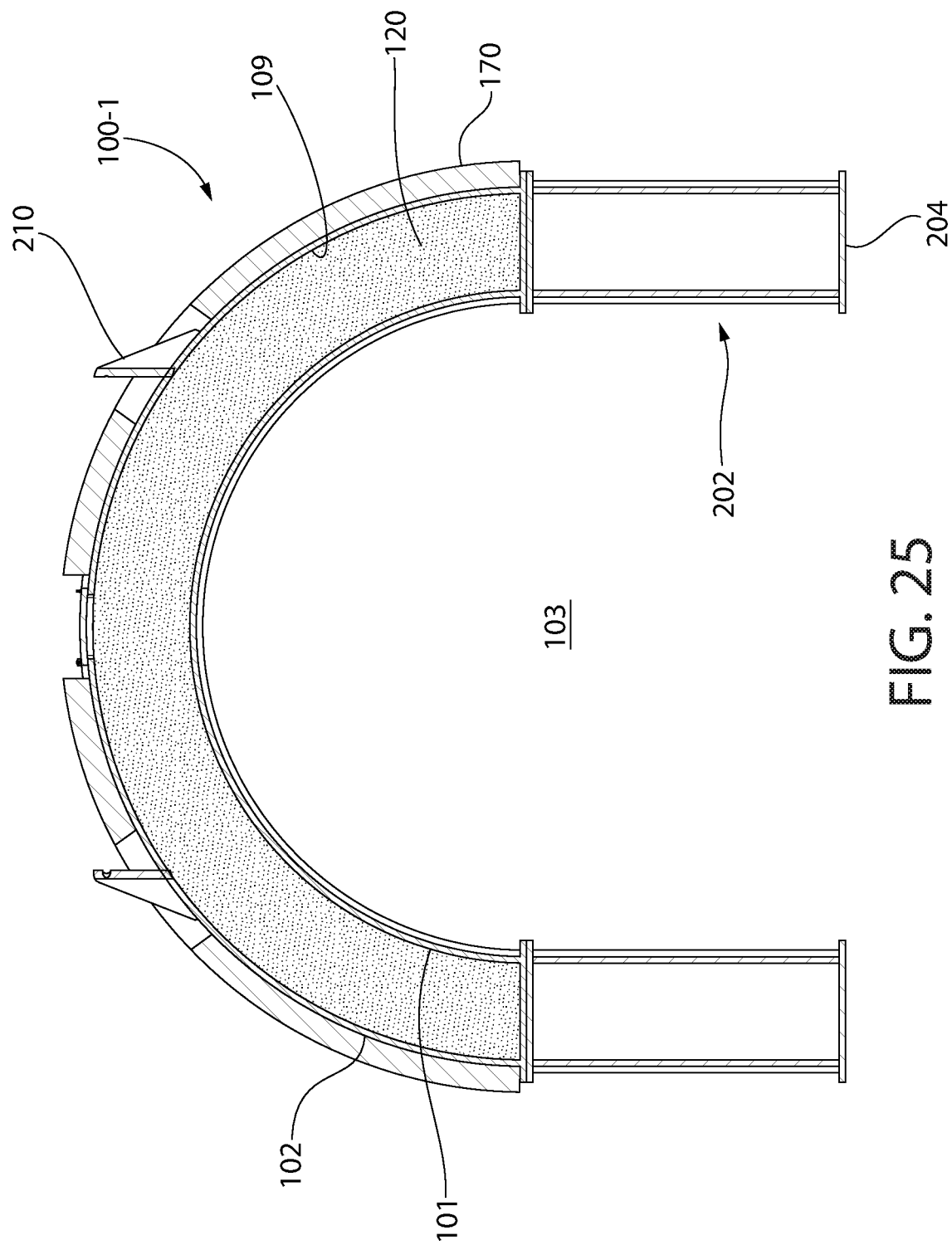
FIG. 25 is a first transverse cross-sectional view thereof.
Figure 26:
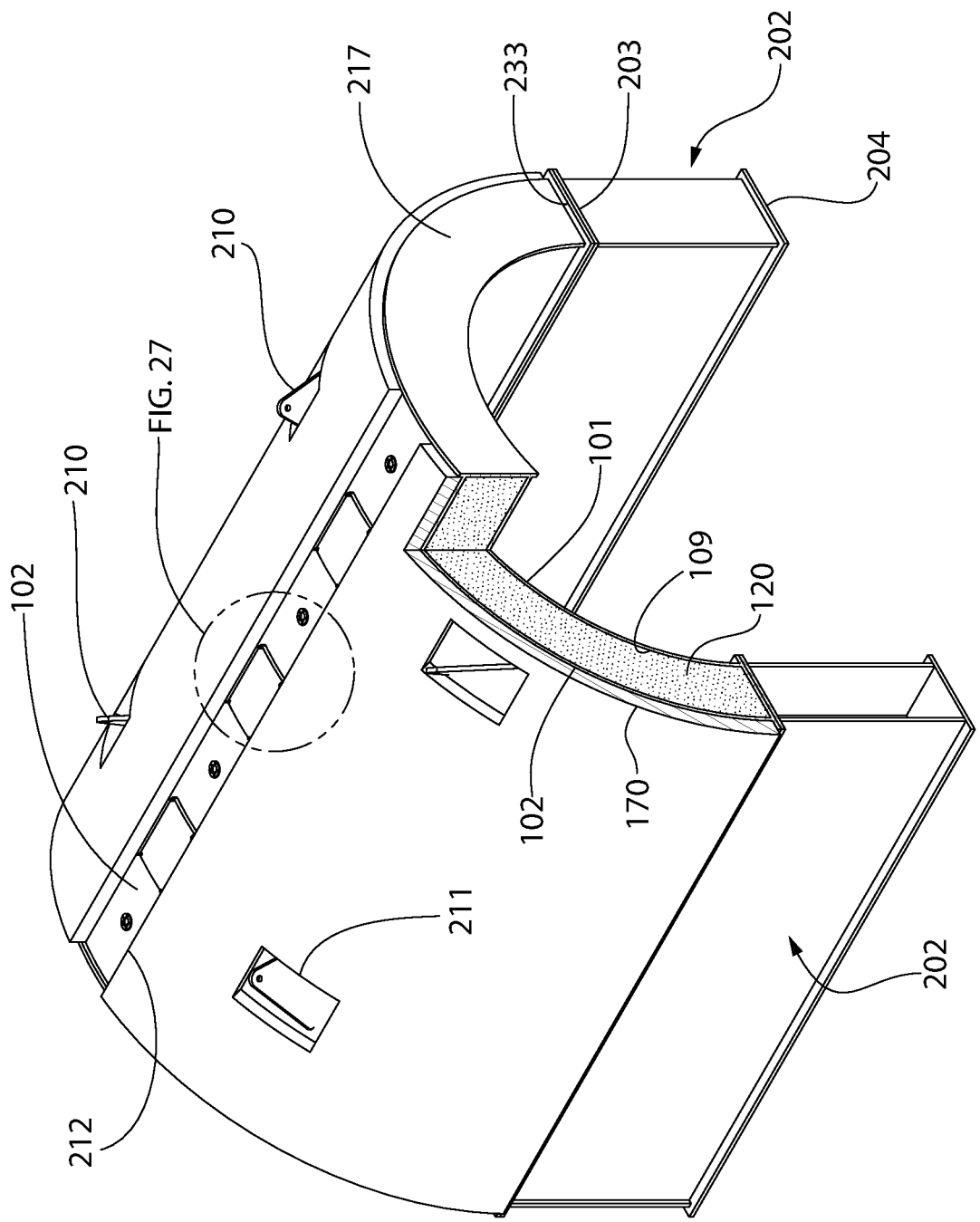
FIG. 26 is a partial cross-sectional perspective view thereof.
Figure 27:
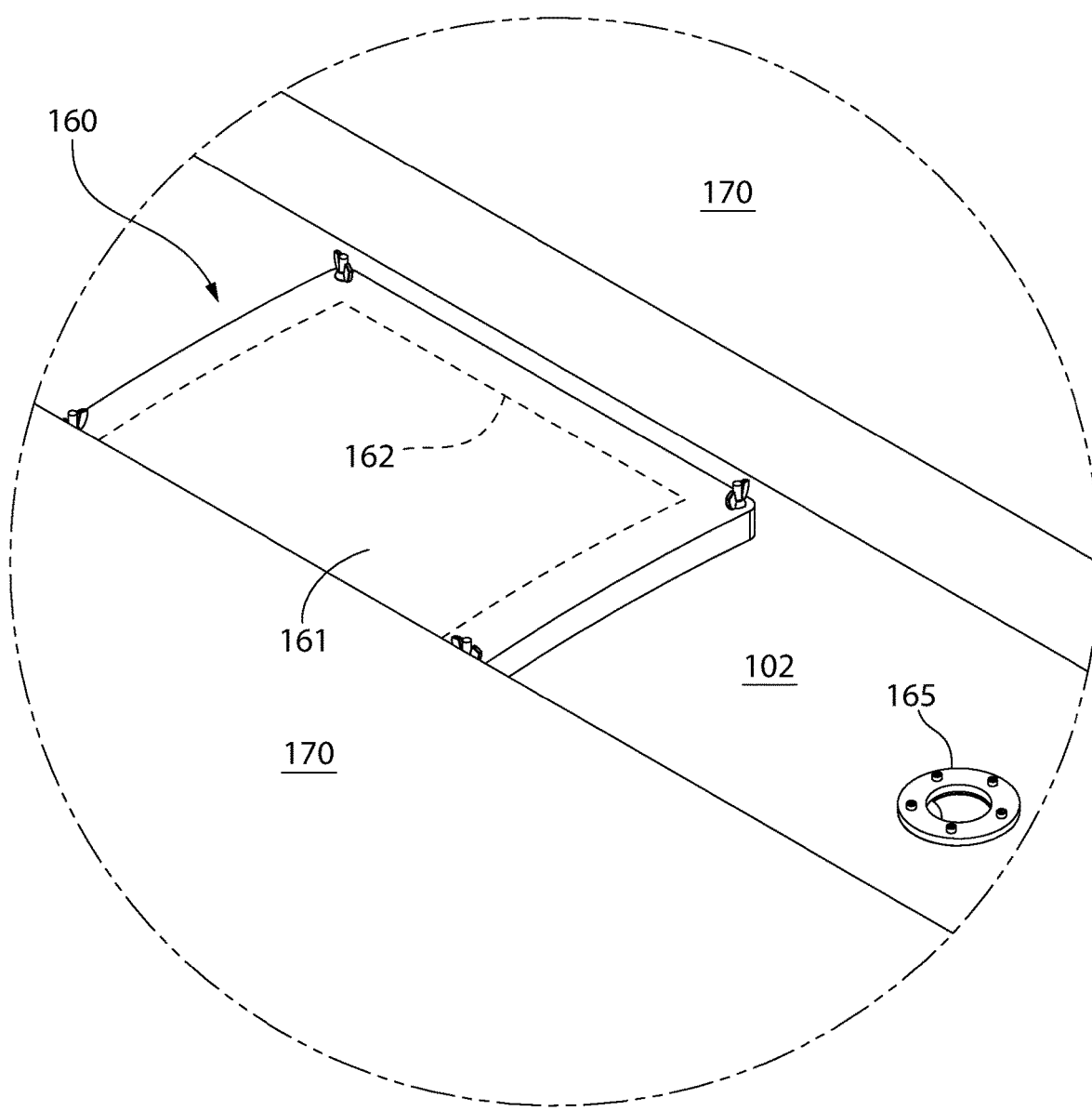
FIG. 27 is an enlarged detail from FIG. 26.
Figure 28:
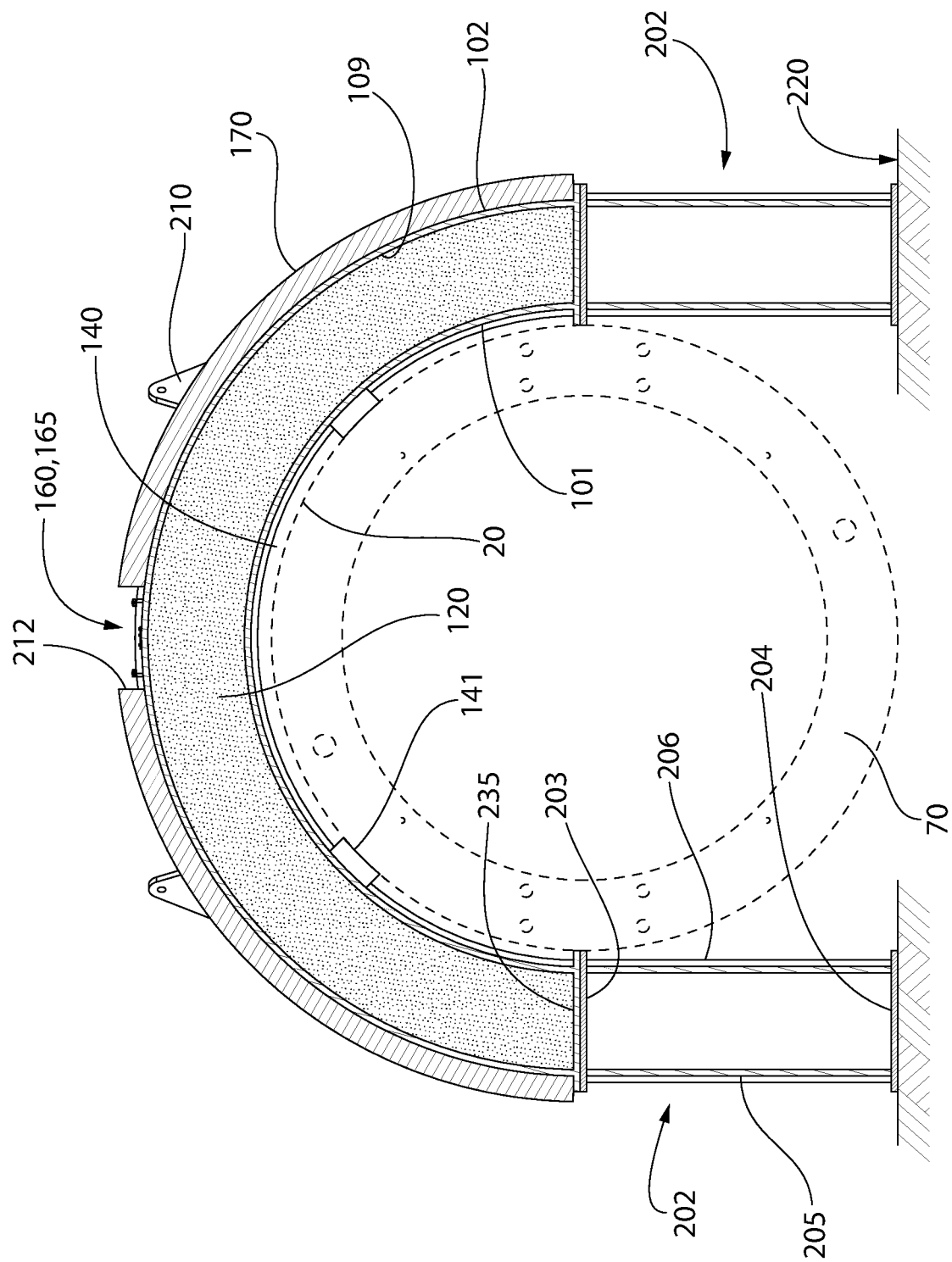
FIG. 28 is a second transverse cross-sectional view of the cooling jacket of FIG. 18

Bottom lid 50 may be removably coupled to bottom support flange 26 of NSC 21 via by suitable fasteners such as threaded fasteners 50-1 as shown (see, e.g. FIG. 17). In such an arrangement, the lid 50 may include a plurality of radially open auxiliary air inlets 50-2 as shown which are in fluid communication with the lower cooling air inlets 34-2 to introduce ambient cooling air into the internal cooling air ventilation annulus 34 of the cask 20. The lid 50 in this arrangement shown in FIG. 17 may have a diameter larger than the outer shell 48 of the inner GBC 40. Alternatively, the bottom lid 50 may be detachably fastened to an annular bottom closure ring 51 (see, e.g. FIG. 2) on the inner GBC 40 by suitable fastening means and have a diameter preferably not substantially larger than the outer shell 48 of the GBC to avoid blocking the lower cooling air inlets 34-2 (see, e.g. FIG. 2). In this arrangement, the lid 50 does not require the radial auxiliary air inlets 50-2. Suitable fasteners include threaded fasteners, interlocking key and key slot arrangements, or other. In either of the foregoing lid construction scenarios, the bottom lid 50 may be considered detachably coupled to the bottom end of the cask 20.

Figure 4:
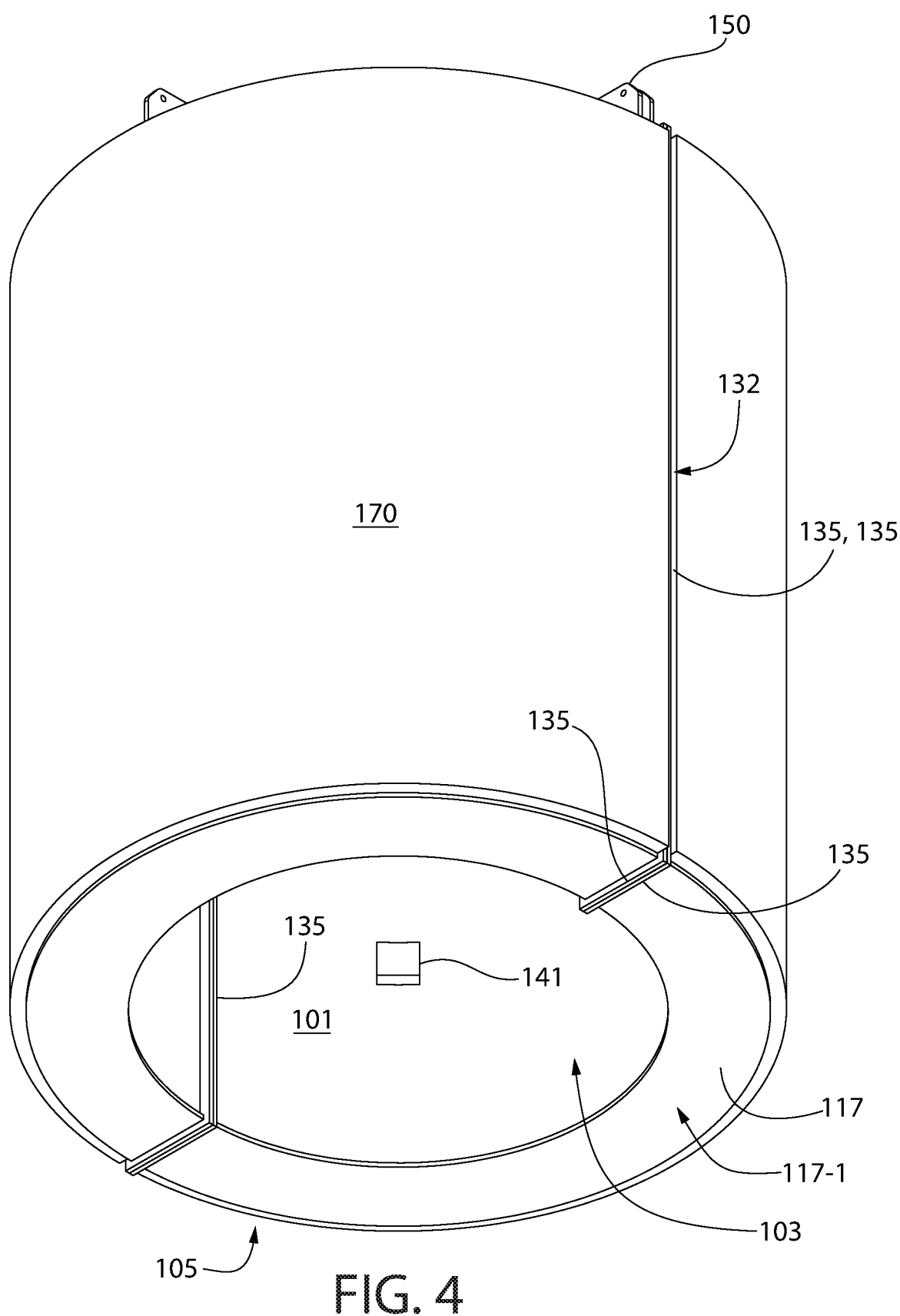
FIG. 4 is a bottom perspective view thereof.
Figure 5:
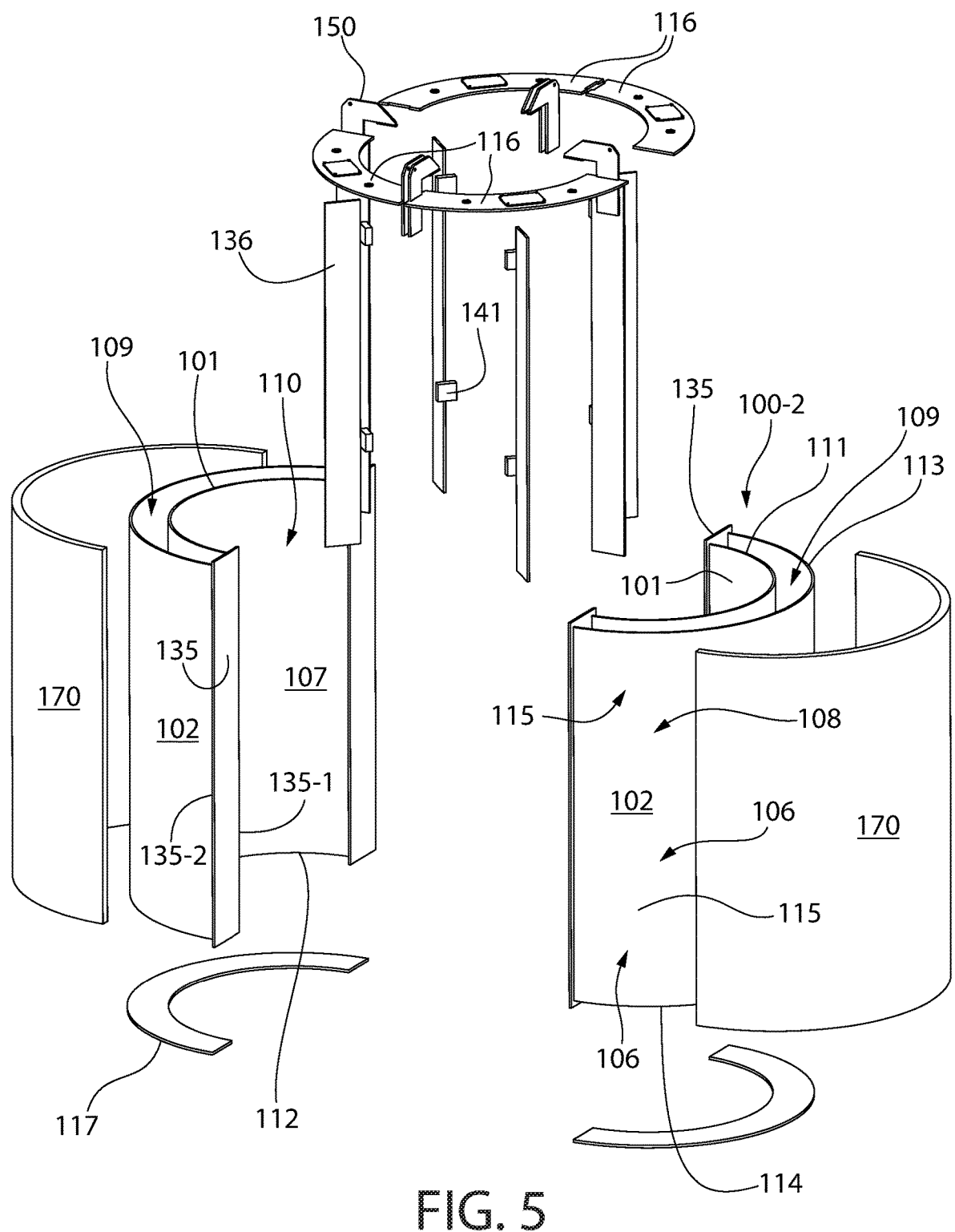
FIG. 5 is an exploded perspective view thereof.
Figure 6:
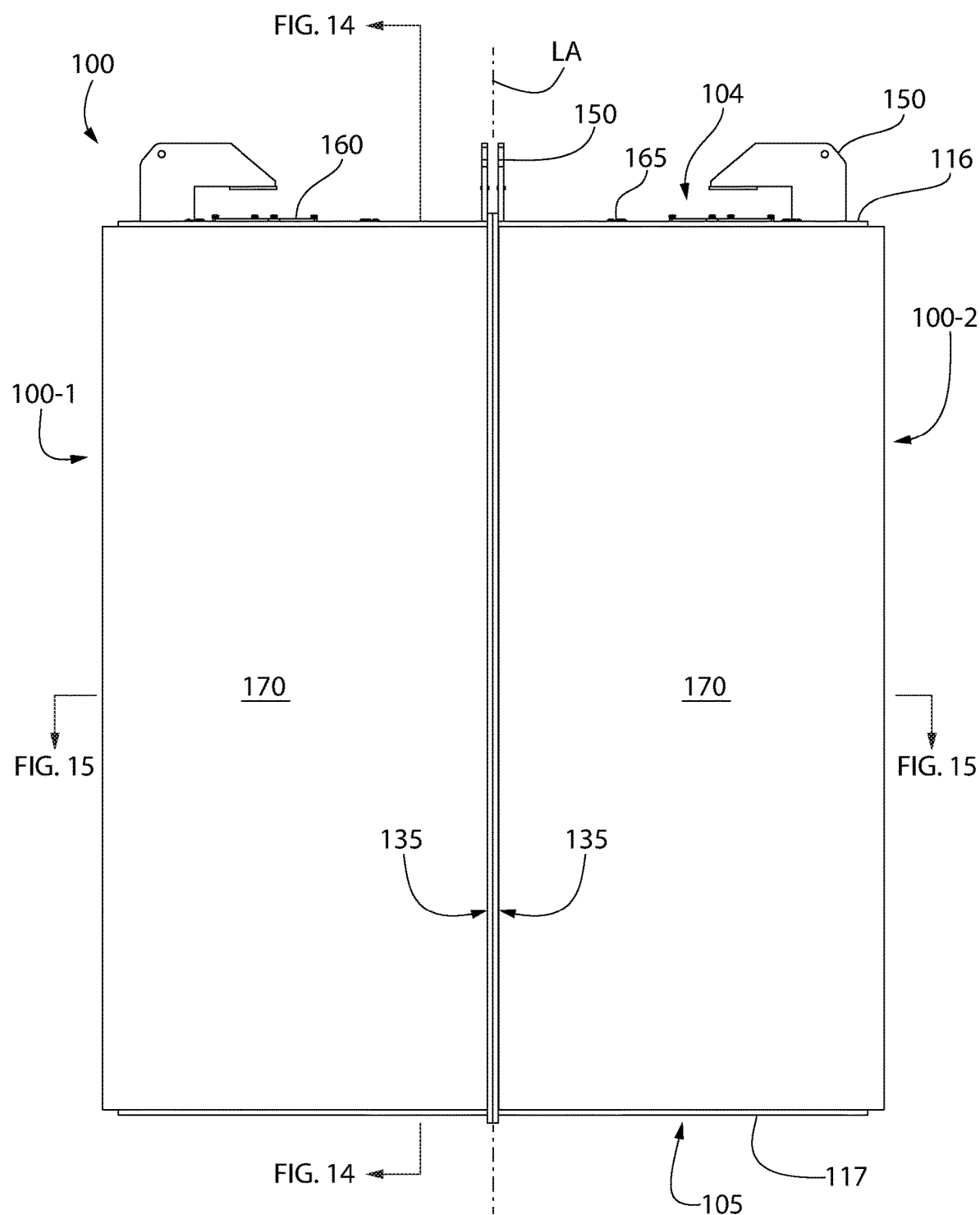
FIG. 6 is a first side view thereof.
Figure 7:
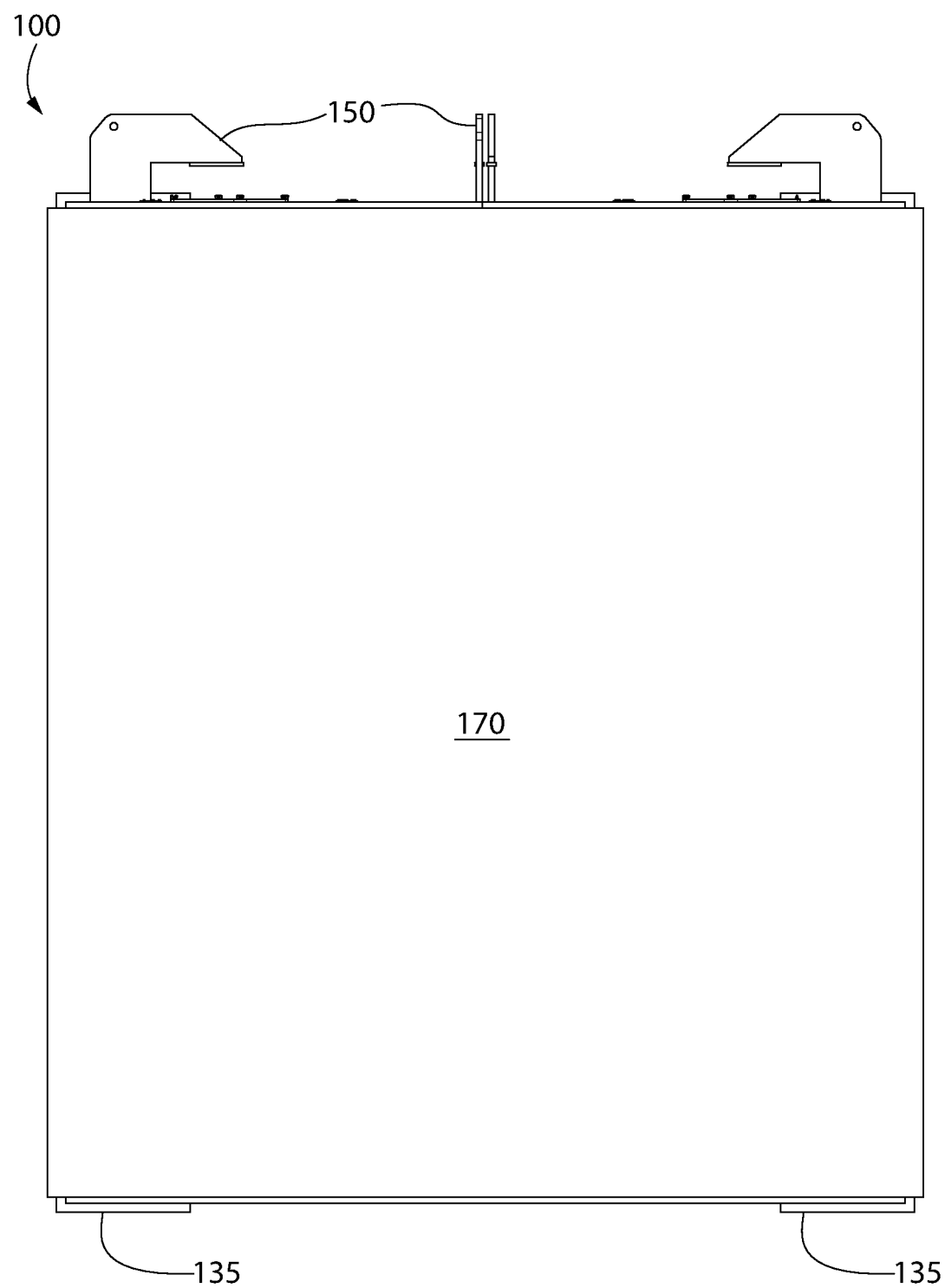
FIG. 7 is a second side view thereof.

With continuing reference generally to FIGS. 1-2 and 16-17, the top end of the inner gamma block cylinder 40 may be terminated by an annular top mounting flange 70. Flange 70 may be considered to define a planar top surface 70-1 of the cask 20. Flange 70 projects radially/laterally outwards beyond the sidewall of gamma blocker cylinder 40 (GBC) defined by its outer shell 48 to engage the top flange 27 of the outer neutron shield cylinder 21 (NSC) as shown in FIGS. 5 and 6. The GBC mounting flange 41 is detachably mounted to the NSC annular top flange 27 by a plurality of mounting fasteners 71 such as threaded bolts in one non-limiting embodiment, thereby detachably coupling the inner and outer cylinders together (see also FIGS. 4 and 11). Fasteners 71 extend vertically completely through GBC mounting flange 70 and engage corresponding upwardly open threaded bores 72 formed in the NSC top flange 27. Top mounting flange 70 may include at least two of lifting lug assemblies 76 as shown to raise and maneuver the cask 20.

In the illustrated embodiment, the annular radial top flange 27 of the outer NSC 21 may include an upwardly open top recess 28. Both the top and bottom flanges 26 and 27 of NSC 21 are rigidly coupled to the sidewall 24 of the neutron shield cylinder 21 such as via welding. Each flange 26, 27 may further protrude radially outward beyond the sidewall defined by outer shell 32 of NSC 21 in one non-limiting embodiment.

A system for cooling a container containing SNF such as cask 20 according to the present disclosure will now be described.

Referring now to FIGS. 3-17, the cooling system generally comprises cooling jacket 100 having a body comprised of an inner shell 101 defining an inner surface 107, an outer shell 102 defining an outer surface 108, a top 104, and a bottom 105. The inner shell 101 defines an interior central space 103 which is configured for receiving the cask 20 at least partially therein (see, e.g. FIGS. 16-17). Space 103 has a transverse cross-sectional area configured to hold no more than a single cask. Space 103 has a diameter (defined by jacket inner shell 101) larger than the outer diameter of the cask to allow the cooling jacket to be slid over the end of the cask and placed thereon. The interior central space 103 may have substantially uniform diameter inclusive of the open top and bottom ends of the cooling jacket which open into central space 103 and form the sleeve-like structure illustrated for surrounding at least the central portions of the cask 20 holding the heat-emitting SNF canister 60.

The inner shell 101 is arranged concentrically to the outer shell 102 and spaced radially apart defining an internal cooling medium cavity 109 therebetween configured to hold a cooling medium 120 which can operate a heat sink to absorb the heat emitted from the cask 20. The inner shell 101 includes a top end 111, bottom end 112, and cylindrical sidewall 110 extending between the ends. Similarly, outer shell 102 includes a top end 113, bottom end 114, and cylindrical sidewall 115 extending between the ends. An annular top closure plate 116 encloses the top of the cooling medium cavity 109. Closure plate 116 defines an upwardly facing top surface 116-1 which may be substantially planar in one embodiment. An annular bottom closure plate 117 encloses the bottom of cooling medium cavity 109 and defines a downward facing substantially planar surface 117-1 in one embodiment.

The cooling medium cavity 109 may extend axially/longitudinally along longitudinal axis LA between the top and bottom ends of the shells 101, 102. Cavity 109 may be vertically continuous between the shells without interruption by any intermediate lateral or radial structures. In other possible embodiments, one or more transversely oriented annular partition plates 118 (represented by dashed lines in FIG. 11) may be provided if it is determined that only a certain vertical portion of the cask 20 requires cooling and/or to more precisely manage the cooling medium or application thereof to certain portions of the cask. The partition plates divide cavity 109 into two or more vertically stacked horizontal portions depending on the number of partition plates used. The radial depth D1 of cooling medium cavity 109 (identified in FIG. 14) of the cooling jacket 100 is sized to hold a sufficient quantity of dry ice to serve the heat sink function for the desired required duration to cool the cask 20. In some typical non-limiting embodiments, D1 may be from about and including 12-18 inches.

In one embodiment, the cooling jacket 100 (inner and outer shells 101, 102) may be circular and circumferentially continuous assemblies forming an annular sleeve-like structure. Such a sleeve-like construction may be slipped over the top or bottom ends of the cask 20 when deployed.

Figure 3:
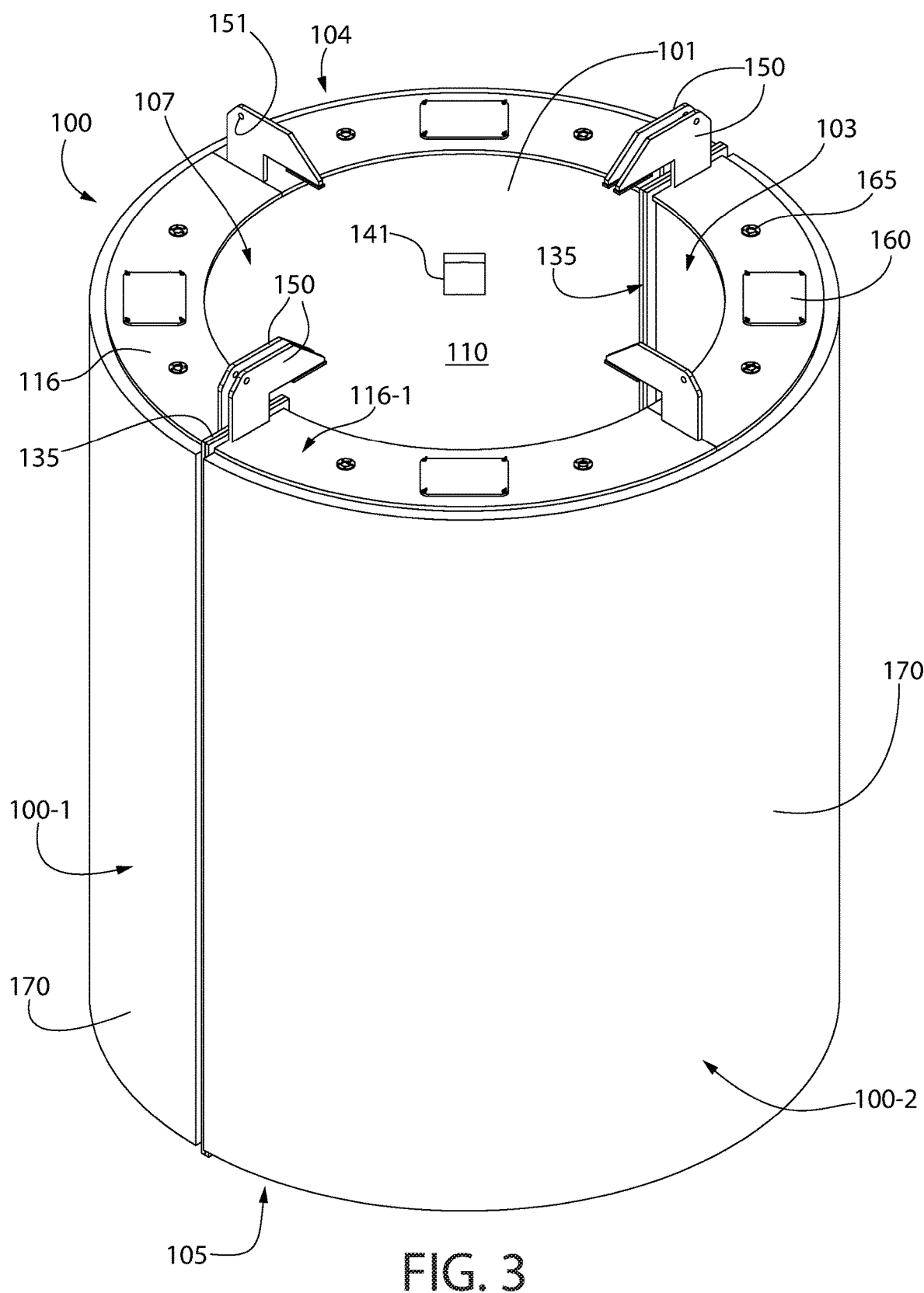
FIG. 3 is a top perspective view of a first embodiment of an external cooling jacket for use with the cask of FIGS. 1 and 2 in a vertical orientation.

In other possible embodiments, as illustrated herein, the cooling jacket 100 may be formed by two or more sections or segments 100-1, 100-2 which are assembled together (see, e.g. FIGS. 3 and 5). In such a construction, the segments may be provided separately and assembled laterally around the cask 20 in the field in an abutted arrangement as shown in the figures. The segments 100-1 and 100-2 may optionally be then be detachably coupled together once emplaced around the cask by any suitable mechanical fastening means, such as for example without limitation a plurality of angle clips 130 and threaded fastener sets 131 (bolts and nuts) spaced longitudinal apart along the height of the cooling jacket at each of the joints 132 between segments 100-1 and 100-2 (shown in dashed lines in FIG. 8). Other detachable fastening means and arrangements may be used and does not limit the invention. Illustrated is only one non-limiting example.

Figure 8:
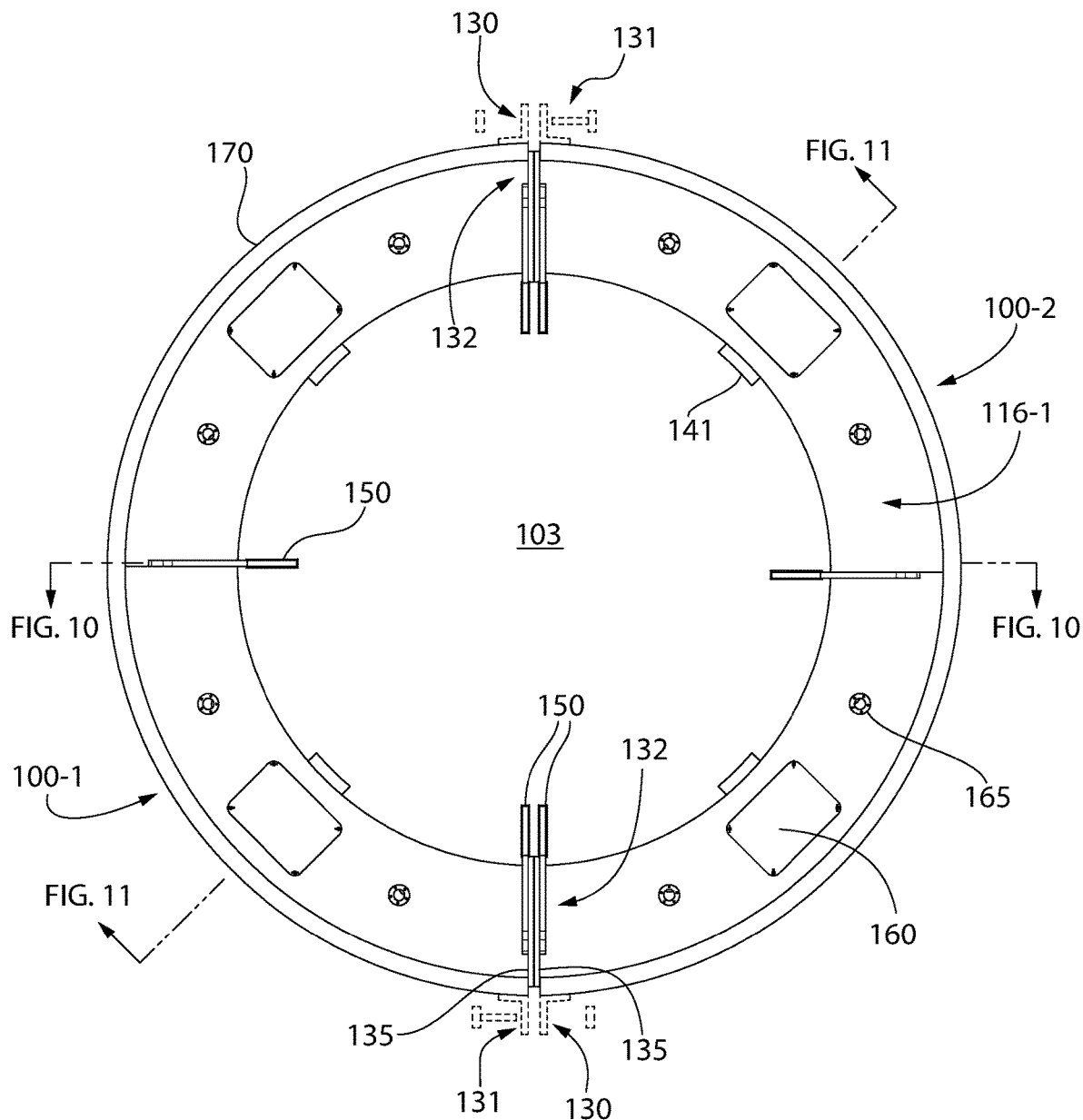
FIG. 8 is a top view thereof.
Figure 9:
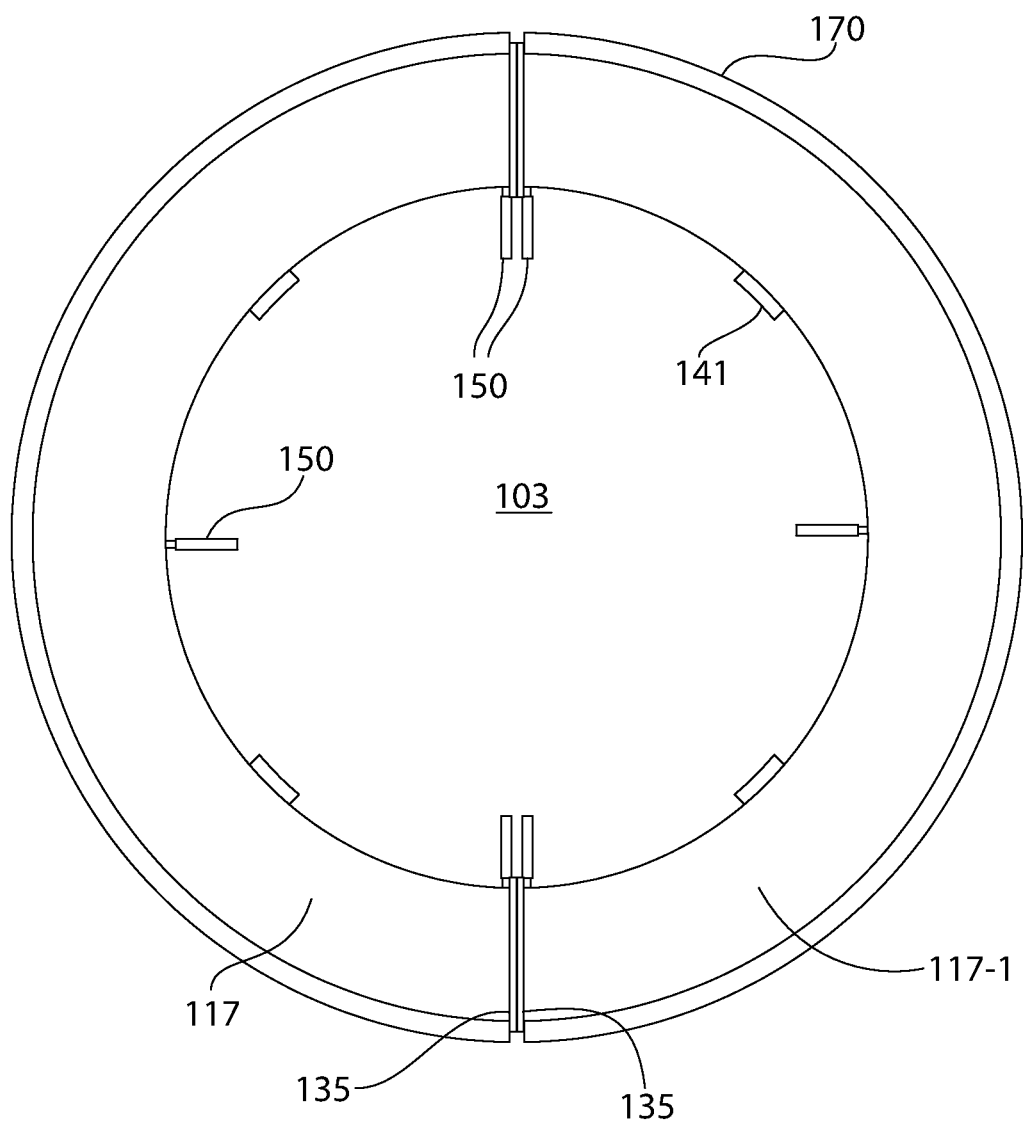
FIG. 9 is a bottom view thereof.
Figure 10:
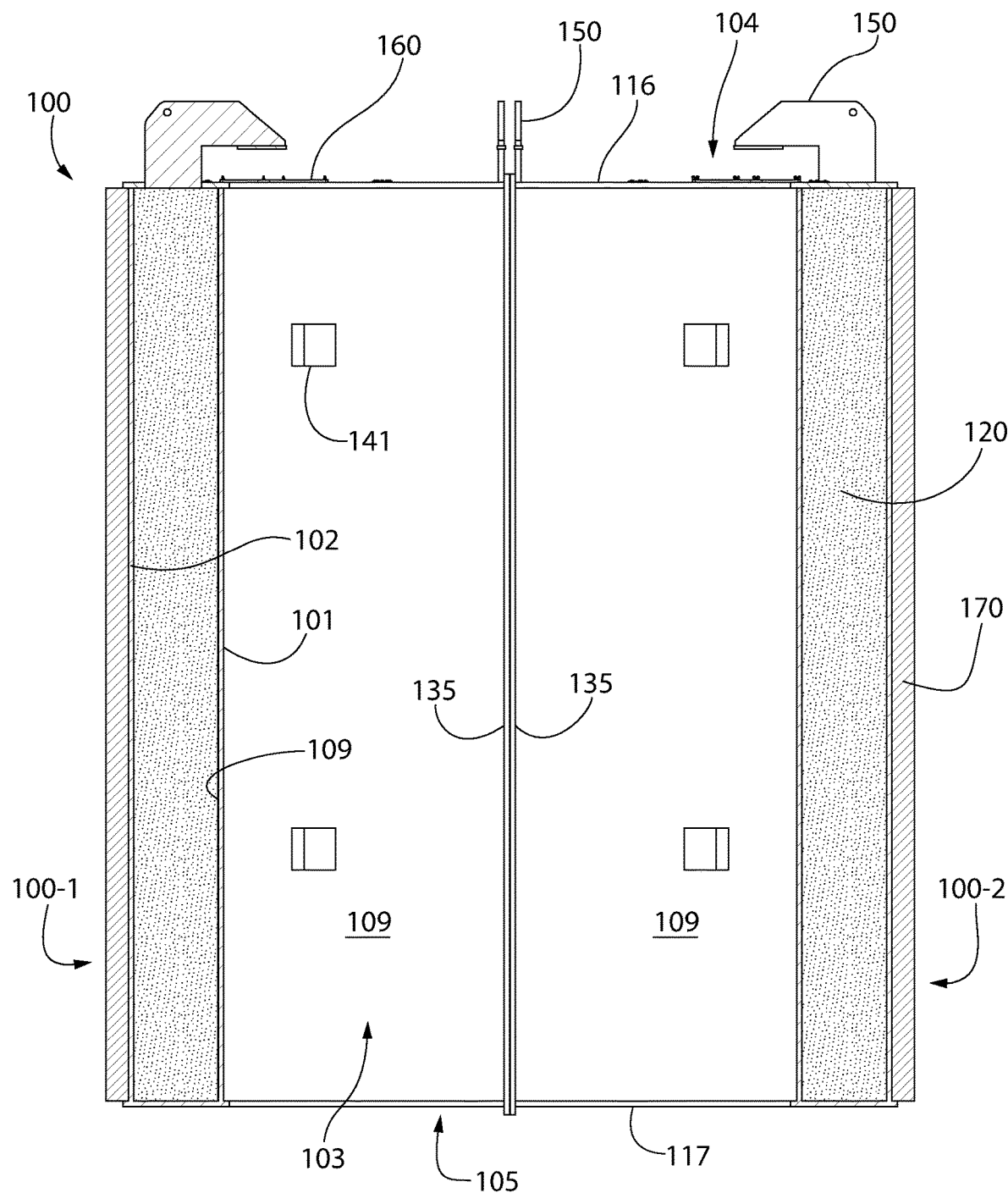
FIG. 10 is a first side cross-sectional view thereof.
Figure 15:
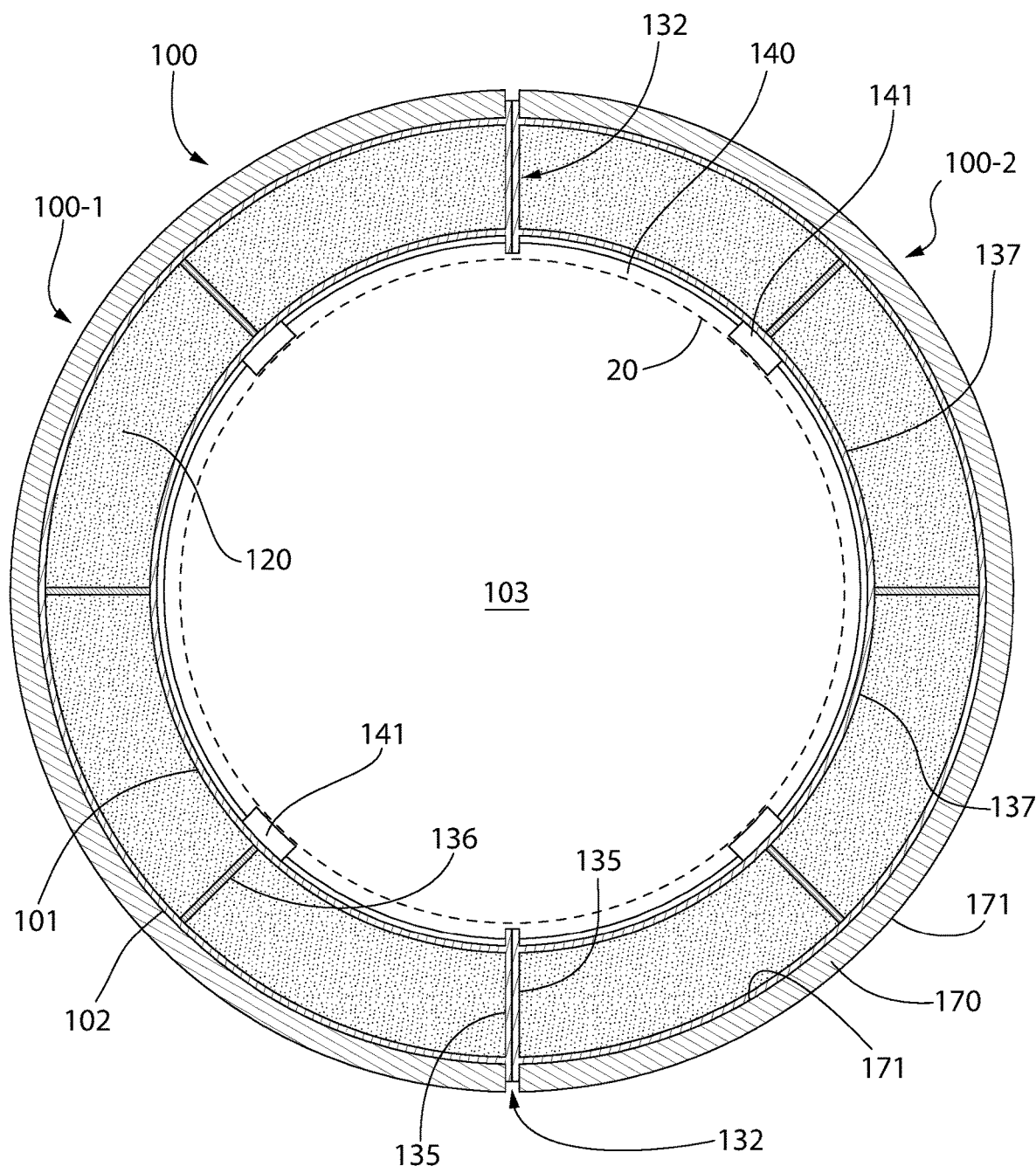
FIG. 15 is a transverse cross-sectional view thereof.

Each cooling jacket segment 100-1, 100-2 has an arcuately curved shape (in top plan view, see, e.g. FIGS. 8 and 15, thereby forming an arc portion of a complete circle. Each segment further has a separate top and bottom closure plate 116, 117 also having a complementary arc shape. Where two segments 100-1 and 100-2 are provided as shown, each segment has a semi-circular shape forming half of a circle. In other embodiments where more than two cooling jacket segments are provided, each segment will have an arcuately curved shape forming less than half of a circle.

When the cooling jacket 100 is provided in multiple segments, the opposite side ends of each segment 100-1, 100-2 may include a longitudinally elongated end wall plate 135 to enclose the sides of the cooling medium cavity 109 of each cooling jacket segment. In the illustrated embodiment, the end wall plates 135 are vertically oriented and extend radially between the vertically oriented longitudinal ends of the inner and outer shells 101, 102 in each cooling jacket segment (see particularly FIG. 5). The inboard vertical longitudinal edges 135-1 of the end wall plates 135 may project radially inwards towards the interior central space 103 of the cooling jacket 100 beyond the inner surface 107 of the jacket. Similarly, the outboard vertical longitudinal edges 135-2 of the end wall plates 135 may also project radially outwards away from and beyond the outer surface 108 of the jacket. In other possible embodiments, the longitudinal edges may be flush with the inner and outer surfaces 107, 108. In either scenario, the mating end wall plates 135 of each cooling jacket segment 100-1, 100-2 are preferably abutted against each other as shown when the segments encircle the cask 20 positioned in the interior central space 103 of the jacket. This forms a continuous external cooling loop surrounding the sides of the cask.

Figure 11:
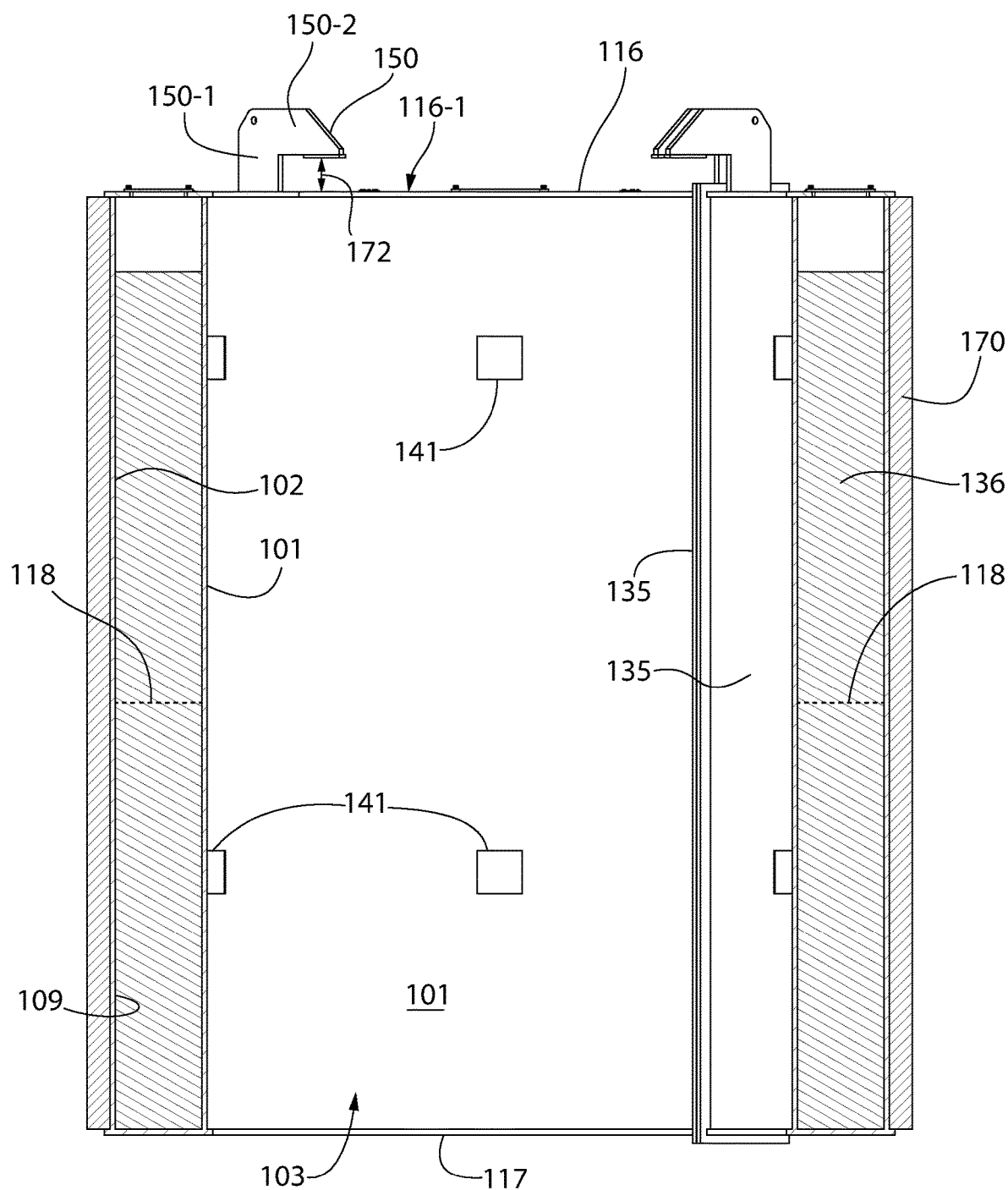
FIG. 11 is a second side cross-sectional view thereof.
Figure 12:
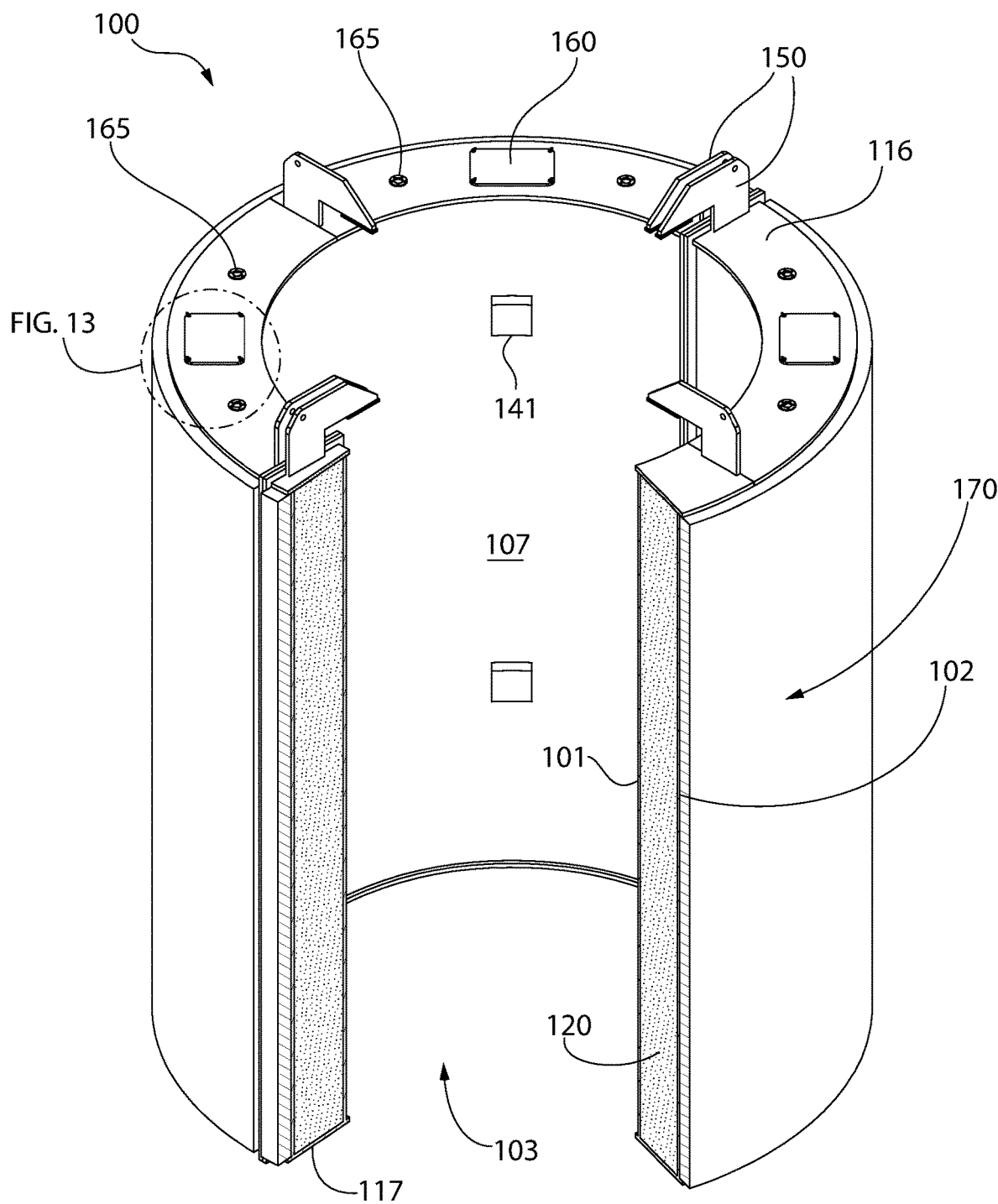
FIG. 12 is a partial cross-sectional perspective view thereof.

In order to further structurally strengthen the cooling jacket 100 beyond the top and bottom closure plates and end wall plates depending on the diameter and size of the jacket, the jacket may also include a plurality of circumferentially spaced apart longitudinal stiffening plates 136 arranged in the internal cooling medium cavity of the jacket (see, e.g. FIGS. 5, 11, and 15). Stiffening plates 136 are vertically oriented when a vertical cask 20 is used as shown in the presently described embodiment. Stiffening plates 136 extend in a radial direction between the inner and outer shells 101, 102, whether either in the circumferentially continuous construction or segmented construction of the cooling jacket 100. Stiffening plates 136 are preferably rigidly attached along their longitudinal edges to the inner and outer shells 101, 102 such as via welding, brazing, soldering, fasteners and clips, etc. The method used depends on the selection of metallic material for the inner and outer shells.

The stiffening plates 136 may extend for a majority of the height of the inner and outer shells 101, 102, and preferably in the illustrated embodiment for more than ¾ the height of the shells as shown in FIG. 11. In the illustrated embodiment, the stiffening plates 136 are rigidly attached to bottom closure plate 117 and have a height 90% or more of the height of cooling jacket 100 and is unattached to the top closure plate 116. This forms an upper plenum area beneath top closure plate 116 and the top edges of the stiffening plates 136 for collecting the accumulating CO2 gas from sublimation of the dry ice in cooling jacket cavity 109. In some embodiments (not shown), the stiffening plates may extend for the entire height of the shell to divide the internal cooling medium cavity 103 into a plurality of isolated cooling compartments 137 each configured for holding the cooling medium 120. Stiffening plates 136 may be rigidly attached to the bottom closure plate 117 by any of the above example methods. Where stiffening plates 136 extend for the full height of the shells 101, 102 and cooling medium cavity 109, the plates may also be rigidly attached to top closure plate 116 in a similar manner.

When cask 20 is placed inside the interior central space 103 of cooling jacket 100, an annular radial interstitial space 140 is formed between the inner shell 101 of the cooling jacket and cask (see, e.g. FIG. 15 (cask represented by dashed circle). The interstitial space 140 is predetermined and preset to achieve the desired air temperature in the interstitial space for cooling the cask. A typical range for the interstitial space 140 may be about 1 inch to about 6 inches; however, different size or depth interstitial spaces 140 may be used as desired.

The cooling jacket 100 may be maintained at a pre-set distance or spacing for interstitial space 140 from the external side surface of the cask by a plurality of radial spacers 141. The spacers 141 advantageously center the cask in the central space 103 of cooling jacket 100 and maintain a relatively uniform annular interstitial gap between the cask and jacket. Spacers 141 are circumferentially spaced apart around and rigidly attached to the inner surface 107 of the cooling jacket 100 (defined by inner shell 101). An array of spacers preferably are provided in at least two elevations; one in the upper half and one in the lower half of the cooling jacket (see, e.g. FIG. 11).

In one embodiment, the spacers 141 may be in the form of metallic pads or blocks which are rigidly affixed to inner surface 107 of inner shell 101 by welding, brazing, soldering, fasteners, or other methods depending on the material used for the inner shell. Spacers 141 may be about 1 inch to about 6 inches in the radial dimension depending on the radial depth of the interstitial space 140 desired between the cask 20 and cooling jacket 100. The spacers 141 have a height and width which is no greater than about 6 inches to form pads/blocks which are not continuous either circumferentially or longitudinally on the inner surface 107 of the cooling jacket 100 as shown (see, e.g. FIGS. 3-5 and 10 as examples). Accordingly, the spacers 141 do not have continuous longitudinal portions which extend between both the upper and lower halves of the cooling jacket. In some embodiments, the spacers may be optionally omitted albeit they are preferred to facilitate proper placement of the cooling jacket and a uniform interstitial space around the cask for even cooling.

It bears noting that in other possible embodiments, the cooling jacket segments 100-1, 100-2 may simply be positioned around the cask 20 without fastening to each other. In yet other embodiments, the two cooling jacket segments 100-1, 100-2 may be detachably or permanently secured together (e.g. via welding, brazing, etc.) in the fabrication shop before shipment to work site. Because typical storage/transfer casks are larger structures in height and diameter, the segmented cooling jacket design advantageously allows easier handling and deployment of the cooling jacket at the work site.

Cooling jacket 100 preferably has a height that covers a majority of the height of the body of the cask 20 as best shown in FIG. 17. In one embodiment jacket 100 has a height H1 which is greater than at least 75% of the height H2 of the cask, and in one embodiment preferably greater than 85% of H2. This ensures effective external cooling of the heat-emitting cask.

Figure 16:
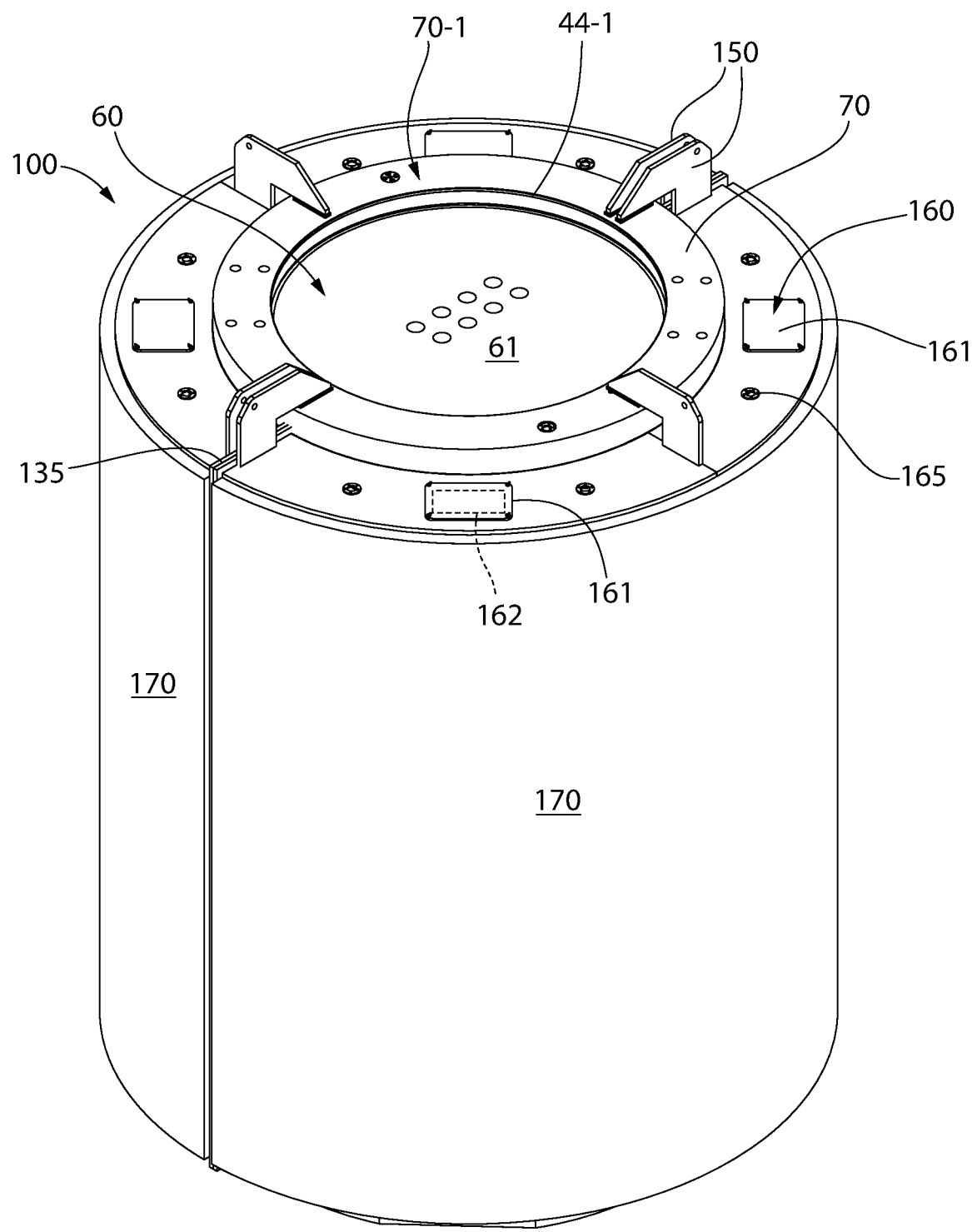
FIG. 16 is perspective view showing the cooling jacket of FIG. 3 installed on the cask of FIG. 1.

Cooling jacket 100 may be detachably mounted to and supported entirely by the cask 20 as shown in FIGS. 16-17. With additional reference to FIGS. 1-12, the cooling jacket may include a plurality of metallic mounting hangers 150 rigidly attached to the top of the cooling jacket. Hangers 150 are circumferentially spaced apart around the top closure plate 116 at the top periphery of the cooling jacket.

In one embodiment, the hangers 150 may comprise L-shaped brackets as shown which include a vertical section 150-1 rigidly/fixedly attached at a bottom end to a top surface 116-1 of the top annular closure plate 116, and a horizontal section 150-2 extending perpendicularly and radially inwards to engage a peripheral portion of the top of the cask such as top surface 70-1 in one embodiment. The bottom edge of horizontal section 150-2 may engage top surface 70-1 of cask 20 as shown. The horizontal section 150-2 may be elevated above and separated from top surface 116-1 of cooling jacket 100 by a vertical gap 172. This positions the top closure plate 116 of cooling jacket 100 below the top surface 70-1 of the cask top mounting flange 70. In one embodiment, hangers 150 may include a rigging hole 151 for use in lifting and maneuvering the cooling jacket 100 into position about the cask. In one embodiment, hangers 150 may be welded, brazed, soldered, mechanically fastened, or otherwise fixedly attached to top closure plate 116 of the cooling jacket by any suitable means to provide a rigid coupling. Threaded fasteners may be used embodiments particularly if the metal composition of hangers 150 is dissimilar to the metal used to form the top closure plate 116 which may involve more complex dissimilar welding. In some embodiments, the hangers 150 may be welded, brazed, soldered, or mechanically fastened to the sides of the stiffening plates 136 and/or end plates 135 for added reinforcement and rigidity. In a non-limiting preferred embodiment, at least four hangers 150 are provided; however, more or less may be provided as needed depending on the weight of cooling jacket 100 and diameter of the cask 20.

FIGS. 16-17 show the mounted position of the cooling jacket 100 on cask 20. The hangers 150 in one embodiment may support the cooling jacket 100 from the cask 20 in a suspended manner as shown. The top mounting flange 70 of cask 20 is at least partially exposed or fully exposed and protrudes above the top closure plate 116 of the cooling jacket. This is because the flange does not require cooling as the nuclear fuel canister 60 is position below the flange inside the cask. The cooling jacket 100 does not extend to the bottom of the cask as shown. The bottom closure plate 117 of cooling jacket 100 is elevated above the bottom lid 50 and bottom flange 26 of the cask 20. Where gusset plates 26-1 are provided with the bottom flange 26, the bottom closure plate 117 of the cooling jacket may at least partially engage the angled gusset plates in some embodiments which helps center the bottom of the cooling jacket about the cask 20. Termination of the cooling jacket 100 above the bottom lid and bottom flange of cask 20 avoids interference with the natural cooling air flow which cools the cask internally as previously described herein.

In one embodiment as shown, the peripherally mounted hangers 150 on cooling jacket 100 do not extend radially inwards beyond the inner edge of the cask top mounting flange 70. This advantageously avoids interference with top central opening 44-1 defined by the mounting flange which leads into cavity 44 of cask 20 and through which the nuclear fuel canister 60 may be inserted into or removed from the cask while the cooling jacket 100 remains in place.

It bears noting that when the cooling jacket 100 is placed around the cask 20 (or another nuclear fuel container such as a canister previously described herein), the cooling jacket is not sealed at its top or bottom to the cask. Accordingly, the interstitial space 140 between the cask and cooling jacket is at least partially open to atmosphere and may be configured to form a ventilation annulus through which ambient cooling air flows to further enhance cooling the cask in addition to the cooling jacket 100. FIG. 17 shows such a convectively cooled cask and cooling jacket arrangement, which is external to the cask and not to confused with any internal cooling air flow inside the cask. As shown by the directional flow arrows, ambient cooling air is drawn into the annular interstitial space 140 at the bottom of the cooling jacket 100, and is heated by cask, creating an upward air flow via natural thermosiphon circulation and exits the top of the interstitial space. This cooling air provision advantageously continues to cool the cask 20 even after the reserve of dry ice inside cooling jacket 100 is depleted. This provides time for the dry ice to be replenished by the operator if necessary.

Figure 13:
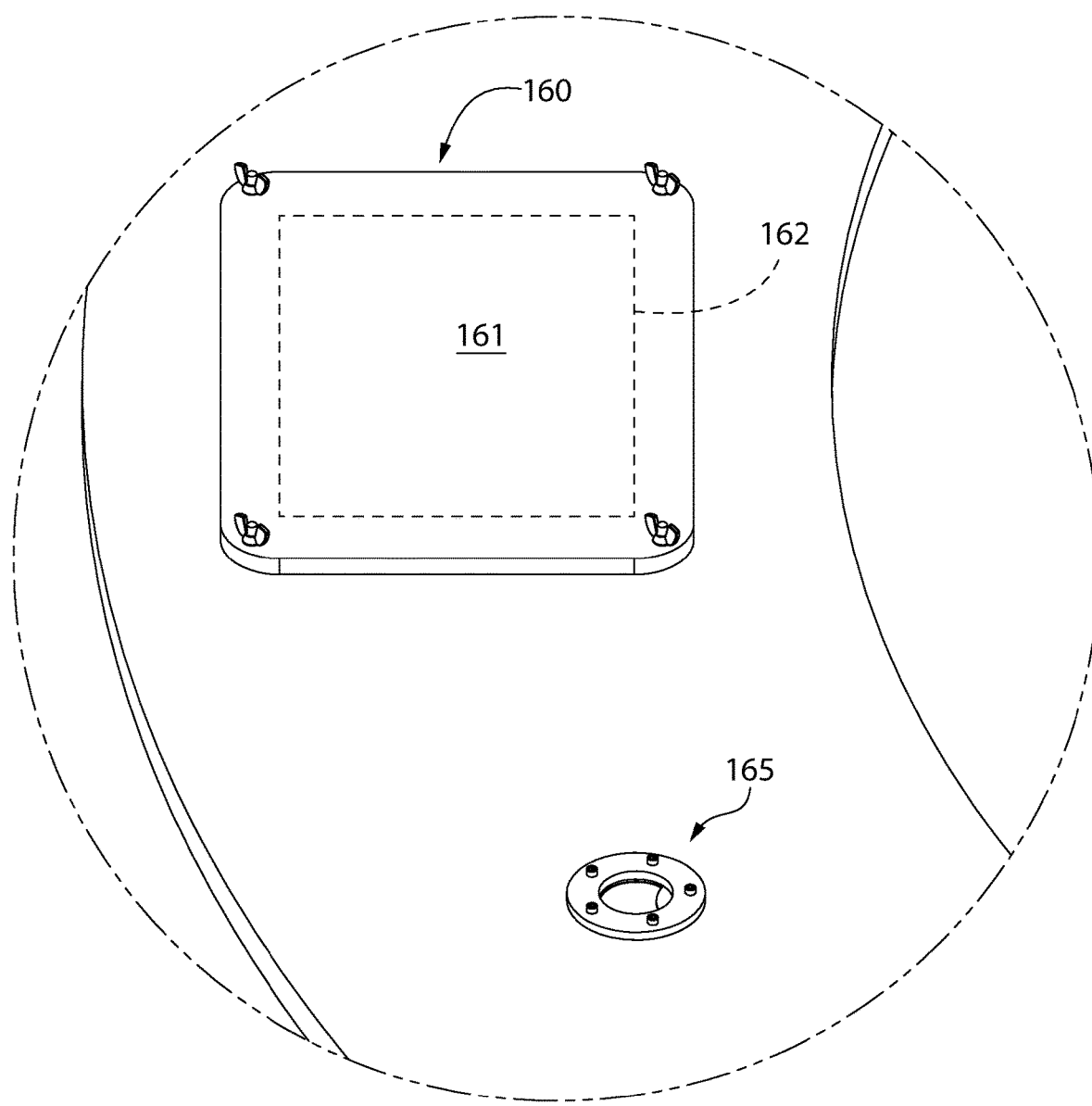
FIG. 13 is an enlarged detail from FIG. 12.
Figure 14:
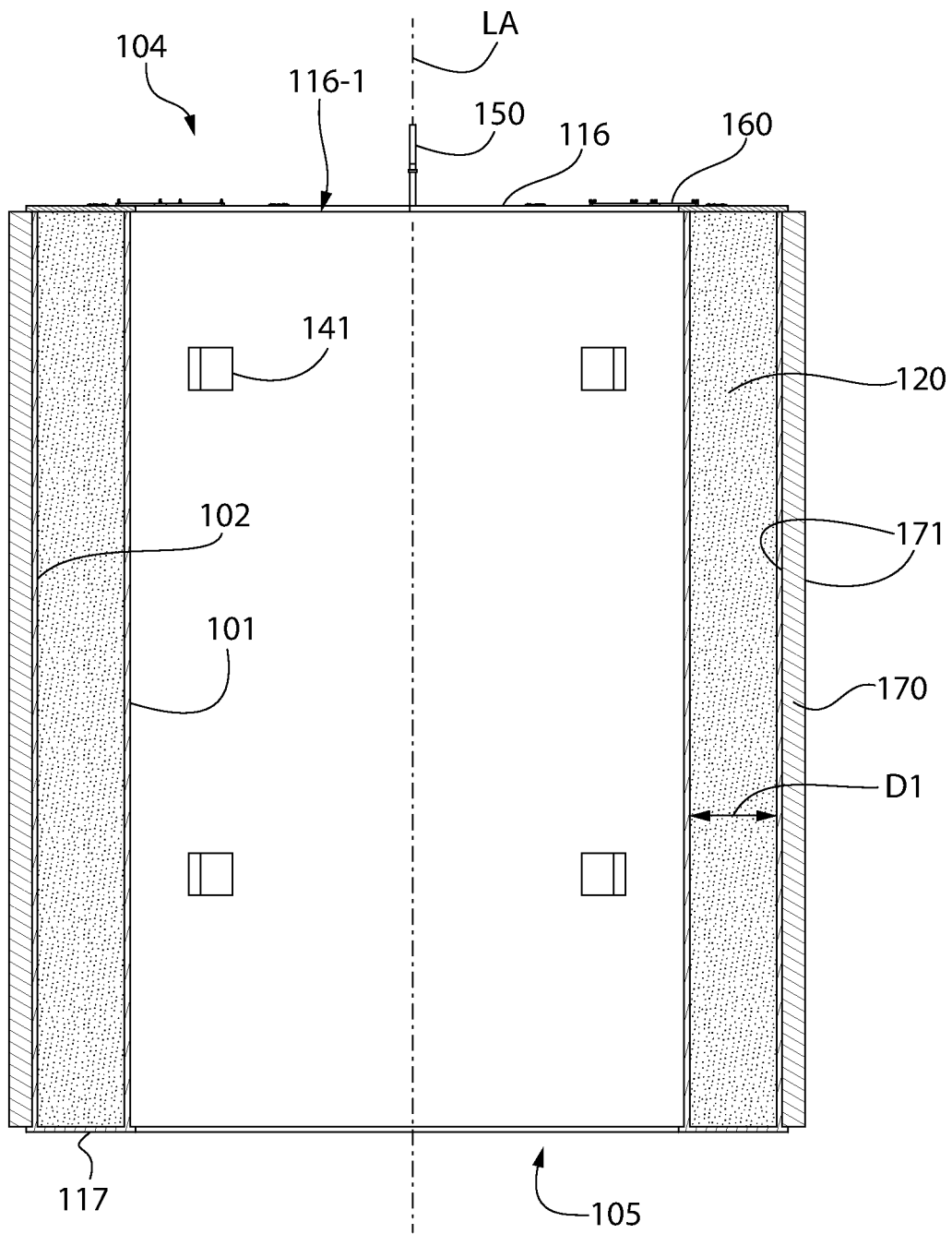
FIG. 14 is third side cross-sectional view of the cooling jacket of FIG. 3.

According to another aspect, the top closure plate 116 of cooling jacket 100 may include a plurality of openable and closeable access hatches 160 for filling the inter-shell cooling medium cavity 109 of the cooling jacket with the cooling medium 120. Each hatch 160 includes a removable hatch cover plate 161 which covers a hatch opening 162 below (see. e.g. FIGS. 13 and 16 showing opening 162 in dashed lines). Any mechanical means may be used to secure each hatch cover plate 161 to the top closure plate 116 of cooling jacket 100, such as threaded fasteners (bolts and wing nuts as shown, bolts and conventional nuts, clips, etc.) as one non-limiting example. In some embodiments, the hatch cover plates 161 may be hingedly mounted to the closure plate 116. Where vertical stiffening plates 136 are provided in the inter-shell cavity 109 of the cooling jacket, an access hatch 160 is provided between each stiffening plate and an adjacent stiffening plate or end plate 135. This allows each compartment within the jacket 100 to receive cooling medium 120.

The cooling medium 120 has a temperature lower than the heated spent nuclear fuel storage/transport cask 20, and preferably lower than the ambient environment. This forms a heat sink in the cooling jacket 100. The energy balance therefore causes the heat to flow and transfer from the higher temperature cask radially outwards to the lower temperature heat sink formed in the cooling jacket 100 by the cooling medium.

The cooling medium 120 is preferably a sublimating cooling medium at normal atmospheric pressure conditions (i.e. 14.7 PSIA equivalent to 1 bar or atmosphere) and normal temperature (68 degrees F. —Fahrenheit) per the normal pressure and temperature (NPT) standard set by the National Institute of Standards and Technology (NIST). Accordingly, one preferred but non-limiting cooling medium used in cooling jacket 100 may be a solid substance having a triple point occurring at a pressure which is greater than normal atmospheric pressure such that the cooling medium sublimates at lower normal atmospheric pressure inside the cooling jacket and changes phase directly from a solid phase (which is easily handled and filled into the cooling medium cavity 109 of cooling jacket 100) to a gaseous phase. In chemistry, the triple point is the temperature and associated pressure at which solid, liquid, and vapor phases of a particular substance coexist in equilibrium. The triple point corresponds to the lowest pressure at which a substance can exist as a liquid. Below that triple point pressure (or alternative temperature), a stable liquid phase cannot be maintained. Sublimation is the change in phase from the solid phase directly to the gaseous phase without passing through an intermediate liquid phase at pressures below the triple point pressure. Accordingly, this "heat absorbing" sublimating endothermic phase change happens at either temperatures or pressures below the triple point of the substance. Heat absorbed by the sublimating cooling medium from the cask 20 via the endothermic reaction forms the heat sink with the internal cavity 109 of cooling jacket 100.

In one embodiment, as previously noted herein, the sublimating cooling medium 120 meeting the foregoing criteria may preferably be dry ice. The dry ice may be provided in any suitable solid form, such as for example without limitation pellets or blocks. Dry ice is solid carbon dioxide ($CO_2$), which turns to gaseous $CO_2$ at the NPT atmospheric pressure and temperature standard conditions via the process of sublimation. In fact, dry ice will sublimate at normal atmospheric pressure over a wide range of temperatures from −200 to 260 degrees F. The dry ice may partially or completely fill the cavity depending on the amount of cooling required. Where dry ice is used, the top closure plate 116 of cooling jacket 100 further includes at least one vent 165 in fluid communication with the internal inter-shell cooling medium cavity 109 of the cooling jacket to vent the gaseous $CO_2$. The vent 165 ensures that the cooling medium cavity 109 remains at atmospheric pressure, and is therefore not pressurized in any manner. In one embodiment, a plurality of vents 165 circumferentially spaced apart around and through the top closure plate 116 may be provided to ensure adequate venting of the gaseous carbon dioxide to atmosphere from the cooling jacket internal cavity 109 which is created by sublimation of the dry ice when heated by the cask. The vents 165 may be holes or slots of any suitable shape and dimension to adequately vent the accumulating carbon dioxide from cavity 109. Where cooling jacket cavity 109 is divided into multiple cooling compartments 137 by the stiffening plates 136 as previously described herein, each compartment preferably has at least one vent 165.

In some circumstances and embodiments, other non-sublimating cooling mediums may be used in conjunction with cooling jacket 100 which can sublimate at NPT conditions. In other possible embodiments, for example, the cooling medium cavity 109 of the cooling jacket may be filled with conventional water ice if dry ice (solid CO2) is not readily available or required. The solid ice when heated may melt into liquid water and/or sublimate at NPT conditions. Drainage holes may be provided in the cooling jacket to release the water produced by the melting ice. In yet other embodiments, chilled cooling water or liquid refrigerant (e.g. ethylene glycol) may be circulated through the internal cavity 109 of the cooling jacket via a motorized pump and commercial chiller in a closed flow cooling loop piping circuit. Such cooling circuits are well known in the art. These alternative cooling mediums to dry ice, albeit less efficient at removal of heat from the nuclear fuel cask 20, may be suitable if the cooling demands of the cask 20 are not severe. The cooling jacket 100 preferably is not designed for air cooling, but can be adapted for such use if needed by adding multiple air inlet holes to the bottom closure plate 117.

To prevent the cooling medium 120 (e.g. dry ice) from absorbing excessive heat from the external ambient environment around the cooling jacket 100, an external insulation jacket 170 may be provided which extends completely around the cooling jacket (see, e.g. FIGS. 5, 11, 12, and 15). The insulation jacket 170 may be secured to the outer surface 108 of the cooling jacket defined by outer shell 102 by any suitable means standardly used to apply insulation to an object. The insulation jacket 170 may have a single continuous annular construction, or may be provided in two or more arcuately curved sections which can be abutted along longitudinal seams as shown to match the outer circumference of the cooling jacket 100. The seams may be taped in some embodiments per standard insulating practices. In the illustrated embodiment, two semi-circular sections are used. Any suitable type and thickness of commercially-available insulation may be used. Examples include fiberglass, mineral wool, Styrofoam, etc. which may optionally include an internal and/or external covering or facing 171 which may be weather-proof for protection against the elements or water inside the reactor containment structure and/or provide an air, radiant, and/or vapor barrier (best shown in FIG. 15). Examples of standard facing materials include Kraft paper, vinyl sheeting, and aluminum foil. Example thicknesses of insulation which be used may be about 1 inches to 4 inches, or more as needed depending on the thermal insulating requirements and ambient temperatures for a given cask cooling application to ensure that heat absorbed by the cooling medium is primarily from the cask side of the cooling jacket 100 rather than the environment. In one exemplary embodiment, the insulation may be about 4 inches thick.

The cooling jacket 100 is made from metallic materials which preferably have good fracture strength and resistance at cryogenic temperatures. The inner shell 101 which faces the cask 20 may be made from a good thermally conductive material such as for example without limitation copper or aluminum (inclusive of their commonly used alloys). The rest of the cooling jacket body (e.g. outer shell 102, top closure plate 116, bottom closure plate 117, end plates 135) and appurtenances (e.g. stiffening plates 136, spacers 141, hangers 150, access hatches 160, etc.) may be made of suitable metallic materials such as for example without limitation aluminum, aluminum alloy, copper, steel, stainless steel, etc. All of the materials used for the foregoing parts preferably have low nil ductility temperatures (NDT), which is a commonly used engineering parameter in the art associated with the temperature at which the failure mechanism of a metal changes from ductile to brittle resulting in fracture. In various embodiments, the inner and outer shells 101, 102 may be formed of the same or different metals. In one embodiment, the inner shell 101 facing the cask 20 may be formed of a metal having a higher thermal conductivity (BTU/(h·ft·° F.)) than the outer shell 102 facing the ambient environment. This would maximize heat transfer from the cask through the inner shell to the cooling medium 120 which is desired heat transfer path to the heat sink, yet minimize heat transfer from the ambient environment to the cooling medium. Non-limiting example constructions would be an inner shell formed of copper and an outer shell formed of aluminum or steel, or inner shell formed of copper or aluminum and an outer shell formed of steel. Any suitable thickness may be used for shells 101, 102. A non-limiting representative thickness that may be used is about ½ inch because the cooling jacket is not intended for radiation shielding, which is provided by the cask. Gamma radiation shielding using metallic materials typically requires substantially greater thicknesses, on the order of about 5 inches or more. Accordingly, the inner and outer shells 101, 102 of cooling jacket 100 preferably have a thickness less than 2 inches, and more preferably 1 inch or less to keep the cooling jacket structure as light weight as possible for lifting and deployment.

A process or method for cooling a container housing spent nuclear fuel (SNF) such as without limitation a cask 20 in this non-limiting example will now be briefly summarized based on the foregoing discussion and with general reference to FIGS. 1-17. The method includes providing an empty cooling jacket 100 and circumferentially surrounding at least a portion of the cask with the cooling jacket. If the cooling jacket is provided as a factory or on-site prefabricated annular structure forming a continuous circle, the jacket may be raised completely above the cask 20 such as via a crane or hoist, and then lowered into position around the exterior of the cask as shown in FIGS. 16-17 (showing the cask). The top hangers 150 of the cooling jacket 100 engage the top of the cask 20 (e.g. top surface 70-1 of top mounting flange 70) while the cooling jacket is being lowered around the cask. The annular interstitial space 140 is formed between the cooling jacket and cask, which may include radially engaging the cooling jacket interior spacers 141 with the outer surface of the cask. The bottom portions of the cask 20 (e.g. bottom flange 26 and lid 50) remain exposed beneath the bottom closure plate 117 of the cooling jacket so as to not interfere with any cooling air provisions which might be incorporated into the structure of the cask.

If the cooling jacket 100 is alternatively provided as two prefabricated segments 100-1, 100-2 as previously described herein, each segment may raised and then lowered to locate each cooling jacket segment around one-half of the cask on opposite sides. The segments need not be fully raised above the top of the cask unlike the continuously circular cooling jacket embodiment described immediately above, thereby advantageously requiring less overhead crane/hoist clearance for positioning the cooling jacket. The cooling jacket segments 100-1, 100-2 may be simply laterally moved or rolled into position about the cask. The end plates 135 of each segment are then abutted against each other so that there is no appreciable gap between the segments. The cooling jacket segments may optionally be detachably coupled together at the end plates 135 such as via the angle clips 130 and threaded fastener sets 131 previously described herein, or another suitable temporary fastening means.

FIGS. 16-17 show the cooling jacket 100 fully in position on the cask 20. Cooling jacket 100 is removably mounted to the cask in a suspended cantilevered manner by top hangers 150. The bottom end of the cooling jacket 100 (e.g. bottom closure plate 117) is elevated above the bottom of the cask as shown. Bottom closure plate 117 may engage gusset plates of the bottom flange 26 of cask 20.

In one scenario once the cooling jacket 100 is in position around the cask, the cooling medium 120 may then be added to the previously empty cooling medium cavity 109 in the cooling jacket via the access hatches 160. The hatch cover plates 160 are removed and then replaced after filling the cooling jacket with the cooling medium during this process. The cooling medium may be dry ice in the present non-limiting example which sublimates at normal atmospheric pressure maintained in the cooling medium cavity 109 by the vent holes 165 in the cooling jacket. With cooling jacket now at least partially filled with dry ice (or substantially completely filled except for some small headspace beneath the cooling jacket top closure ring 116 inside cavity 109, the heat sink is therefore now formed in the cooling jacket and ready for operation to cool the cask 20.

It bears noting that in another scenario, the cooling jacket 100 may be filled with dry ice first before placement around the cask 20. The method is not limited by either scenario; however the first scenario is generally preferred as it preserves the dry ice the longest by adding it after the cask is positioned inside the cooling jacket 100.

Heat emitted external surface of the cask by the cask 20 by the spent nuclear fuel contained therein is transferred radially outwards across interstitial space 140 to the cooling jacket 100. The heat is absorbed by the dry ice in this non-limiting example which becomes heated. The dry ice undergoes sublimation changing from its initial unheated solid phase directly to gaseous carbon dioxide (CO2) inside the cooling medium cavity 109 of the cooling jacket, thereby cooling the cask. The gaseous CO2 rises in cooling medium cavity 109 and is vented to the ambient atmosphere via the vents 165 in the cooling jacket top closure plate 116. Continued heating of the dry ice by the heat emitted from cask 20 continuously accelerates converts more and more of the dry ice to vaporous CO2. The external and/or internal temperature of the cask may be monitored by suitable temperature sensors (e.g. thermistors, thermocouples, thermometers, etc.) to determine the effectiveness of the cask cooling operation. When the dry ice is depleted to an amount which results in the increase in the external and/or internal temperature of the cask detected by the temperature sensors, additional quantities of dry ice may be added to cooling jacket 100 as needed.

It bears noting that the dry ice will begin to sublimate when placed inside the cooling jacket 100 at normal atmospheric pressure alone, but at a slower rate than when the cask is in place inside the cooling jacket. The added heat emitted by the cask 20 from the SNF housing therein (e.g. such as within nuclear fuel canister 60) accelerates the sublimation process and depletion rate of the dry ice as the heat is absorbed.

Once the cooling jacket 100 is mounted to cask 20, the method may further include lifting and moving the assembly from a first location to a second location in the nuclear power generation facility and/or fuel storage facility.

In other possible variations of the foregoing method, the cooling jacket 100 may first be position on the desired available horizontal support surface (which may be at grade, below grade, or above grade in a nuclear power generation or nuclear fuel storage facility, and then the cask may be raised and lowered inside the cooling jacket. This deployment mode of the cooling jacket is only possible where the inside diameter of the cooling jacket (defined by inner shell 101 or diametrical distance between spacers 141 if provided) is larger than the largest outside diameter of the cask. In this embodiment, the top mounting hangers 150 are omitted and the bottom end 105 of the cooling jacket 100 defined by bottom closure plate 117 would engage the available support surface. For cask 20 configured disclosed herein, it bears noting that the largest outside diameter is defined by the annular bottom flange 26 and is larger than the smallest inside diameter of the cooling jacket 100. Accordingly, for such a cask configuration, the method must be practiced by lowering the cooling jacket 100 over the cask 20, or laterally positioning cooling jacket segments 100-1, 100-2 if provided around the cask as initially discussed above. This results in the assembly cooling jacket and cask arrangement shown in FIGS. 16-17 and already discussed above.

FIGS. 18-31 depict an embodiment of a cooling jacket 200 suitable for use with horizontal storage of spent nuclear fuel (SNF) which is used in some nuclear waste storage facilities. Horizontal cooling jacket 200 is similar in design, construction, and operation to vertical cooling jacket 100 previously described herein. For the sake of brevity, only notable differences will be described now.

Figure 29:
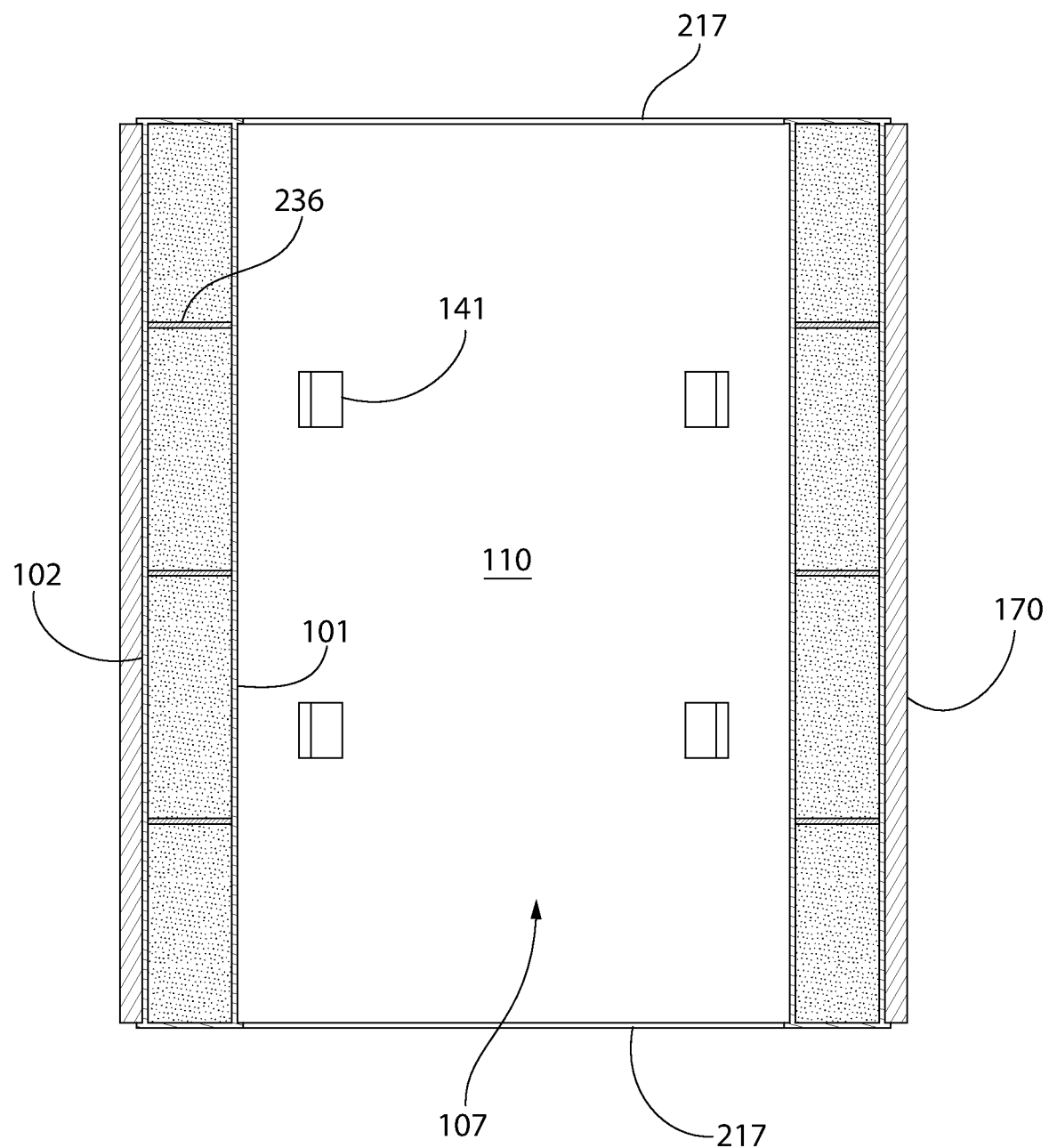
FIG. 29 is a longitudinal cross-sectional view thereof.
Figure 30:
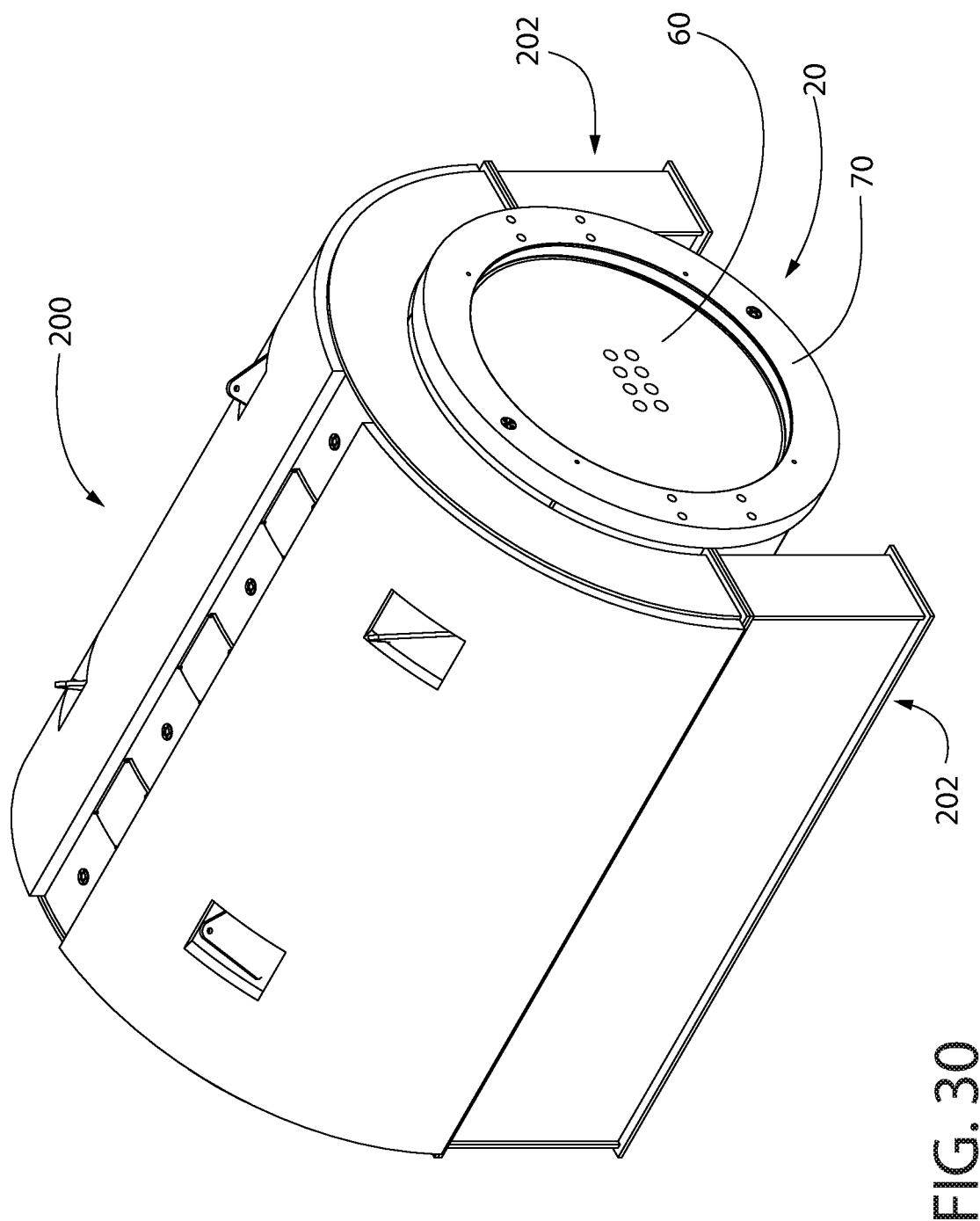
FIG. 30 is perspective view showing the cooling jacket of FIG. 18 installed on the cask of FIG. 1.
Figure 31:
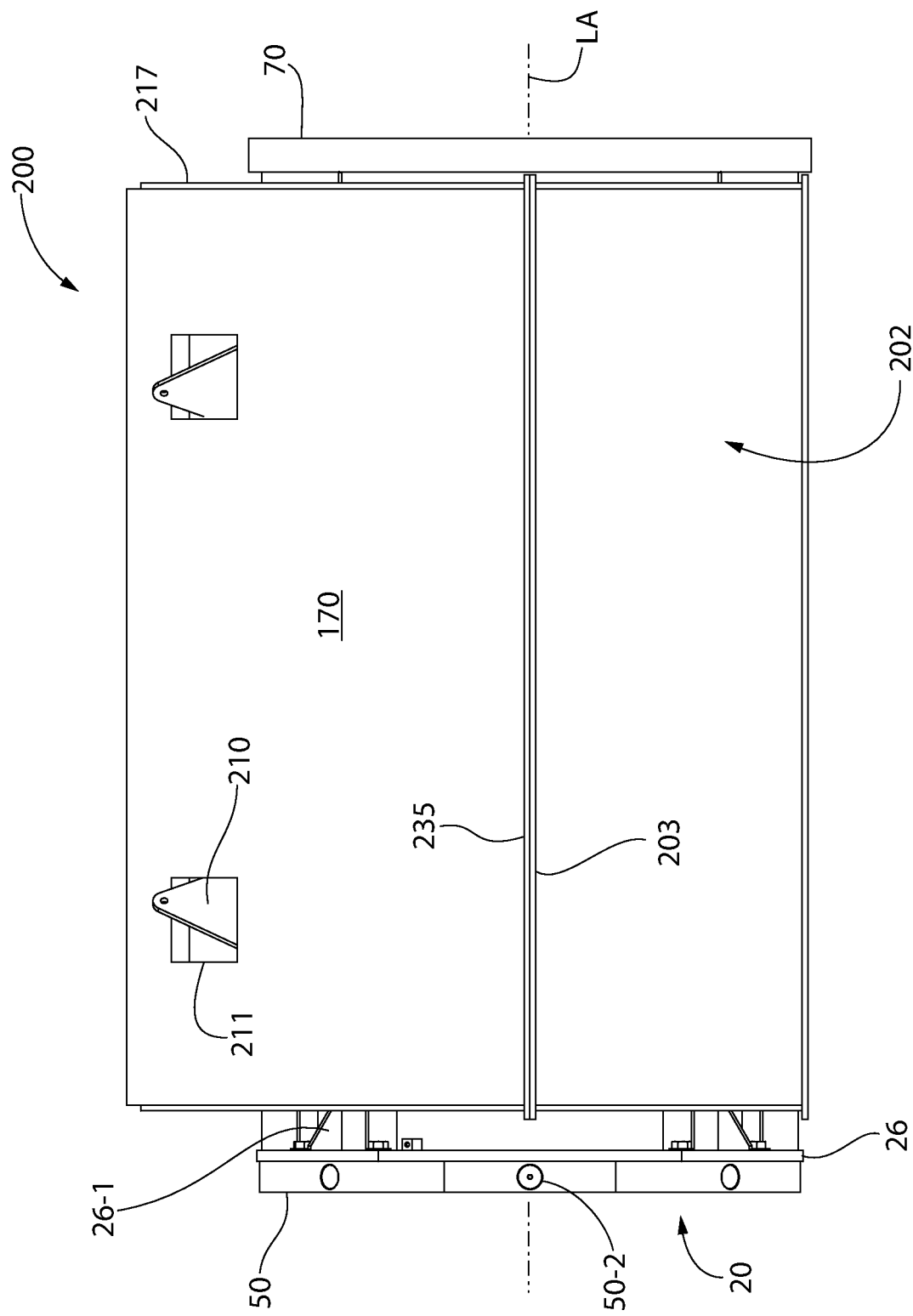
FIG. 31 is a side view thereof.

Referring to FIGS. 18-31, cooling jacket 200 has a horizontal orientation when deployed on the cask 20 which is oriented horizontally (see, e.g. FIGS. 30-31). Cooling jacket 200 may comprise a single semi-circular segment 100-1 which arches over and covers the top half portion of the cylindrical sidewalls of the horizontal cask. A plurality of lifting plates 210 are rigidly affixed to the outer shell 102 of cooling jacket 200 such as via welding, brazing, soldering, fasteners and clips, etc. In one embodiment, at least four lifting plates are provided to provide a balanced load for lifting via a crane or hoist to position the cooling jacket over the cask. Cutouts 211 may be formed in the outer insulating jacket 170 to allow the lifting plates to project outwards beyond the insulating jacket for rigging.

In the present horizontal embodiment of the cooling jacket 200, the access hatches 160 and vents 165 are formed through the outer shell 102 of the jacket and communicate with cooling medium cavity 109 inside the jacket. In one embodiment, a series of longitudinally spaced apart hatches 160 and vents 165 may be formed at the top dead center location in the outer shell 102; the latter for venting the gaseous CO2 produced by sublimation of the dry ice to atmosphere from the cooling medium cavity 109 of cooling jacket 200 when in use. A longitudinally-extending channel 212 is formed in the outer insulating jacket 170 to accommodate the hatches and vents.

Cooling jacket 200 further includes substantially flat and linear bottom support plates 235 on each side, which are analogous and similar in construction, design, and to end plates 135 of vertical cooling jacket 100. The support plates 235 support the weight of the cooling jacket 200. Arcuately curved and flat end closure plates 217 are provided on each longitudinal end of the cooling jacket 200, which are analogous and similar in construction, design, and function to bottom closure plate 117 of cooling jacket 100.

A pair of vertical standoffs 202 are provided which engage and support the bottom of each side of the cooling jacket 200. Standoffs 202 elevate the cooling jacket above the support surface 220 on which the cask 20 is supported from (see, e.g. FIG. 28). The standoffs are laterally spaced apart. Each standoff includes a flat horizontal top plate 203 and opposing bottom plate 204, a plurality of flat longitudinal spaced vertical support plates 201 extending perpendicularly between the top and bottom plates. An optional outer cover plate 205 and inner cover plate 206 may be provided which enclose the open spaces formed between the support plates 201 and further stiffen the standoff structures. Top plates 203 each abuttingly engage one of the bottom support plates 235 of cooling jacket 200 in a flat-to-flat interface when cooling jacket 200 is placed on standoffs 202. In some embodiment, the bottom support pleats 235 of cooling jacket 200 and top plates 203 of standoffs 202 may be detachably coupled together during use of the cooling jacket via a plurality of fasteners, clamps, or other temporary securement means.

Cooling jacket 200 also includes a plurality of spacers 141 similarly to vertical cooling jacket 100 which are located in the central space 103 defined by the cooling jacket to receive the cask 200 at least partially therein. The spacers maintain the interstitial space 140 formed between the cask and cooling jacket 200 in a similar manner as well.

Although cooling jacket 200 is shown as a single assembly, in other possible embodiments the cooling jacket may be formed of multiple arcuate segments each less than a half circle.

In order to further structurally strengthen the cooling jacket 200, the jacket may also include a plurality of horizontally/longitudinally spaced apart radial stiffening plates 236 arranged in the internal cooling medium cavity of the jacket (see, e.g. FIG. 29). These plates serve a similar function to stiffening plates 136 of vertical cooling jacket 100. Stiffening plates 236 are vertically oriented when a vertical cask 20 is used as shown in the presently described embodiment. Stiffening plates 136 are arcuately curved in shape and extend in a radial direction between the inner and outer shells 101, 102 of cooling jacket 200. Stiffening plates 136 are preferably rigidly attached to the inner and outer shells 101, 102 such as via welding, brazing, soldering, fasteners and clips, etc. The method used depends on the selection of metallic material for the inner and outer shells.

The horizontal cooling jacket 200 is positioned or deployed about cask 20 and used in a similar manner to vertical cooling jacket 100 previously described herein to externally cool the cask. In the illustrated embodiment, cooling jacket 200 is raised completely over the horizontally oriented cask 20 and lowered into position on the standoffs 202 which may already be positioned on the horizontal support surface 220. In other possible embodiments, the standoffs 202 may alternatively be detachably coupled to the cooling jacket 200 before placement on the support surface 220 about the cask.

Variations in the sequence of steps related to any of the foregoing cooling jacket deployment methods or processes previously described herein may be used in practice and does not limit the invention.

Either the vertical or horizontal embodiments of the cooling jacket 100 or cooling jacket 200 disclosed herein provides flexibility to the designer to tailor the rate of heat extraction to the cask's needs by controlling parameters such as the radial gap (interstitial space 140) between the cask and cooling jacket, and absorptivity of the cooling jacket inner surface 107 and inner shell 101 material/thickness facing the cask. Means to identify the quantity of remaining dry ice in the cooling jacket can be discerned by telltale holes/connections at the top of the jacket cavity 109 or by suitably located sight glasses. Although the cooling jackets 100, 200 are ideally suited for cooling the cask during short term operations at a worksite; the jackets are not normally intended for long haul of loaded casks. Calculations show that the cooling jacket 100 or 200 can optimally be sized for use with transfer casks to maintain their cooling function for up to 12 hours with adequate margin (i.e. one extended worker shift). For longer short-term operations, intermediate replenishment of the dry ice in the jacket will typically be required.

Figure 32:
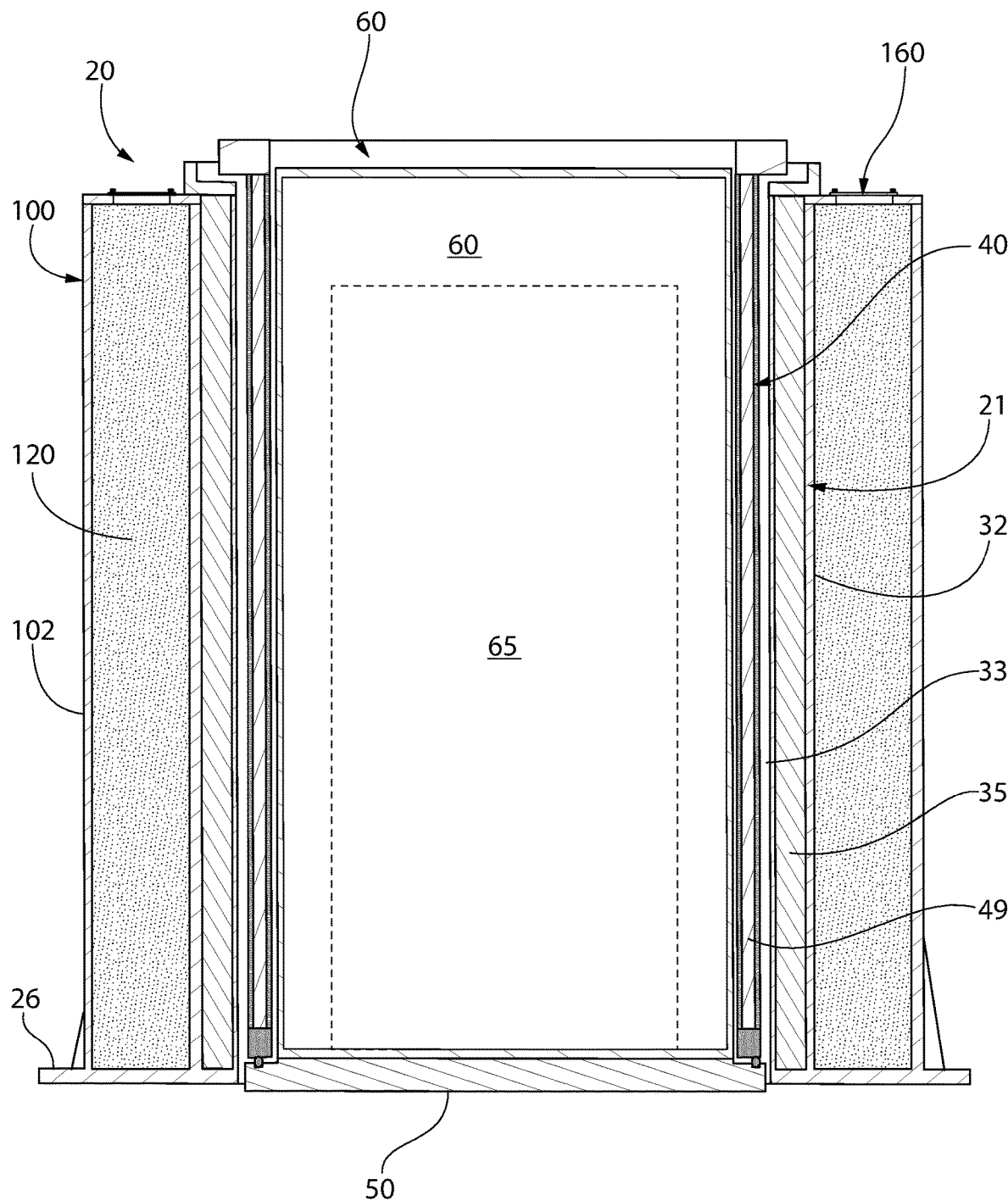
FIG. 32 is a side cross-sectional view of a first embodiment of a cask of FIGS. 1 and 2 having a body comprising an integral non-separable cooling jacket.
Figure 33:
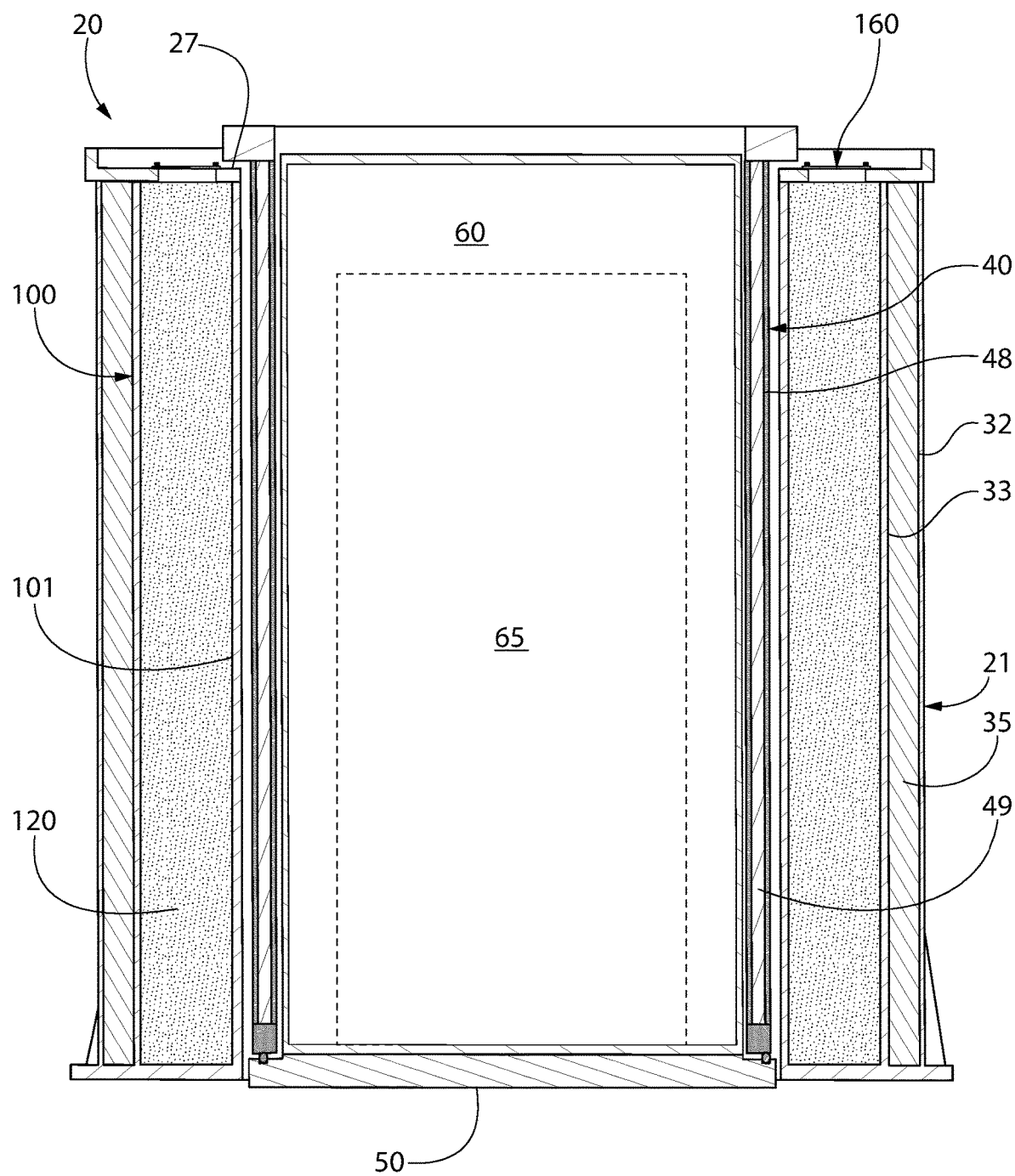
FIG. 33 is a side cross-sectional view of a second embodiment of the cask of FIGS. 1 and 2 having a body comprising an integral non-separable cooling jacket.

In alternative embodiments contemplated, cooling jacket 100 may be incorporated into the body of the cask 20 in lieu of being a detachably coupled device. FIGS. 32 and 33 depict a cask 20 with incorporated and integral cooling jacket.

In FIG. 32, integral cooling jacket 100 forms an outermost portion of the body of the cask 20; the inner gamma blocker cylinder (GBC) 40 and outer neutron shield cylinder (NSC) 21 forming inboard portions of the cask body. In this embodiment, the inner shell 101 of cooling jacket 100 may be omitted and outer shell 32 of NSC 21 provides the same function as inner shell 101 to contain the cooling medium 120, which may be dry ice in some embodiments. The cooling jacket 100 in this embodiment need comprise only a single cylindrical outer shell.

In FIG. 33, the integral cooling jacket 100 forms an intermediate portion of the body of the cask 20 being disposed and sandwiched between the inner gamma blocker cylinder (GBC) 40 and outer neutron shield cylinder (NSC) 21. In this embodiment, the inner shell 33 of NSC 21 may provide the same function as outer shell 102 of cooling jacket 100 which may be omitted.

Each of the integral cooling jackets 100 of FIGS. 32 and 33 contain the same access hatches 160 and top vents 165 as previously described herein for adding cooling medium 120 to the cooling medium cavity 109 and permit venting gaseous $CO_2$ from the cavity, respectively.

It bears noting that the integral cooling jacket 100 of FIGS. 32 and 33 each may form part of the outer neutron shield cylinder (NSC) 21 which may be separable from the concentrically arranged inner gamma blocker cylinder (GBC) 40 nested therein as previously described herein. In other possible embodiments where the NSC and GBC are not separable from each other as in conventional cask body constructions, the inner shell 101 of the integral cooling jacket 100 may be omitted entirely as it is not necessary. In such a cask construction for the embodiment of FIG. 33, the outer shell 48 of inner GBC 40 and inner shell 33 of outer NSC 21 form the inner and outer containment boundaries of the cooling jacket 100, respectively. The cooling medium 120 is therefore disposed directly between and contacts shells 48 and 33. The same top access hatches 60 and vents 65 are provided through the cask structure for adding cooling medium and venting gases from cooling medium cavity 109 to atmosphere, as previously described herein. This unitary cask body construction embodiment is shown in FIG. 34.

Figure 34:
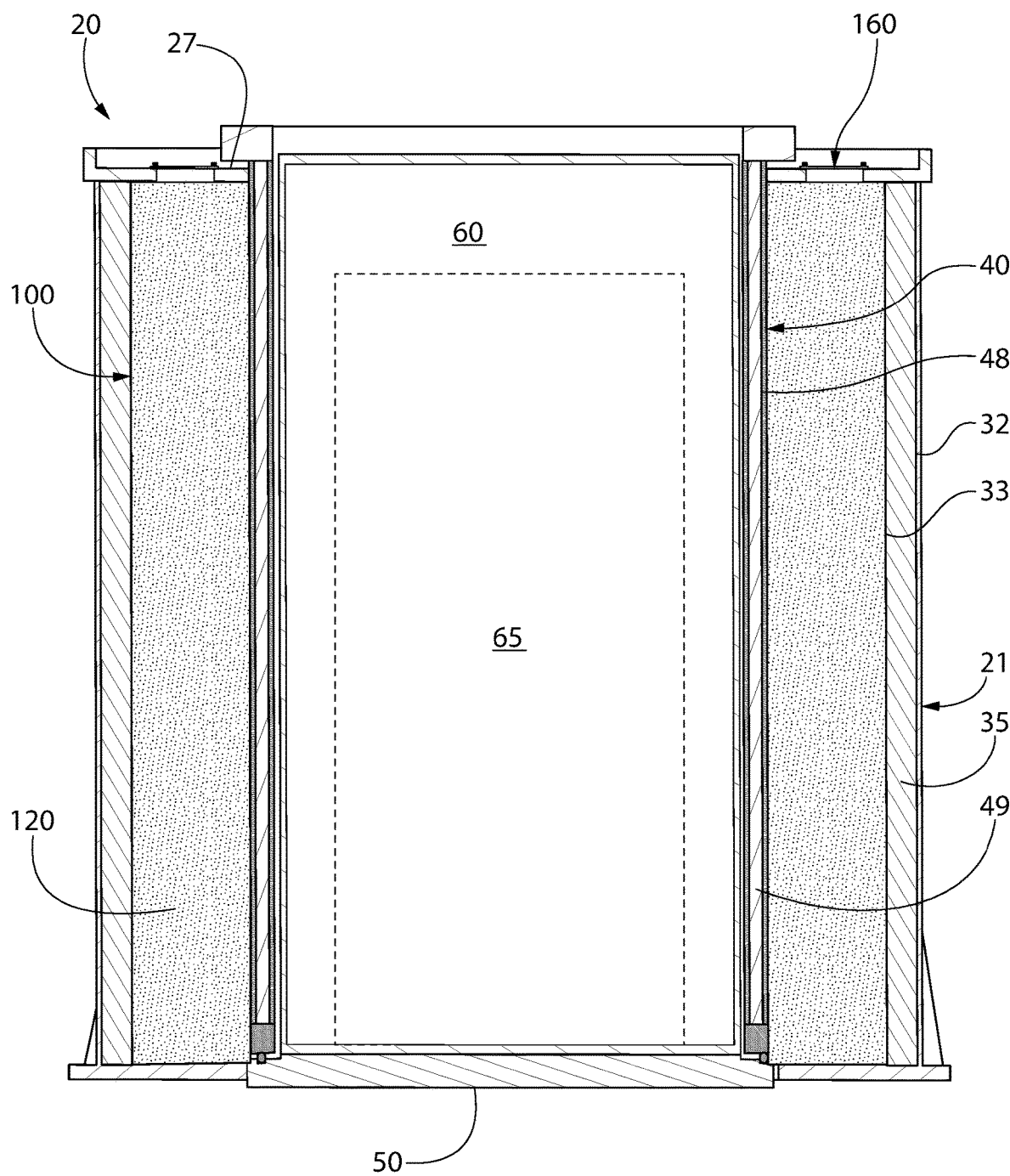
FIG. 34 is a side cross-sectional view of a variation of the cask of FIGS. 1 and 2 having a body comprising an integral and non-separable NSC, GBC, and cooling jacket.

Although the cask embodiments shown in FIGS. 32-34 are illustrated as containing a single integral cooling jacket 100, in other possible embodiments more than one cooling jacket 100 may be provided which may each contain the same or a different type of cooling medium in various implementations and uses.

While the foregoing description and drawings represent some example systems, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A system for cooling high level radioactive waste, the system comprising:
   a cask comprising a storage cavity containing the high level radioactive waste emitting heat; and
   a cooling jacket at least partially surrounding the cask, the cooling jacket comprising a cooling medium cavity containing a cooling medium that sublimates at normal atmospheric pressure, the cooling medium providing an external heat sink for absorbing the heat emitted from the cask from the high level radioactive waste.

2. The system according to claim 1, wherein the cooling jacket comprises a metallic inner shell and a metallic outer shell, the cooling medium cavity being defined between the inner and outer shells.

3. The system according to claim 2, wherein the cooling jacket further comprises an annular top closure plate affixed to top ends of the inner and outer shells, and an annular bottom closure plate affixed to bottom ends of the inner and outer shells.

4. The system according to claim 3, wherein the top closure plate includes an openable and closeable access hatch configured for filling the cooling medium cavity of the cooling jacket with the cooling medium.

5. The system according to claim 3, wherein the cooling medium is dry ice and the top closure plate further includes a plurality of vents in fluid communication with the internal cavity of the cooling jacket, the vents circumferentially spaced apart and configured for venting gaseous carbon dioxide to atmosphere from the cooling medium cavity which is created by sublimation of the dry ice upon absorbing the heat emitted by the cask from the high level radioactive waste.

6. The system according to claim 2, wherein the inner shell is formed of a material having a greater heat transfer coefficient than the outer shell.

7. The system according to claim 6, wherein the inner shell is formed of copper and the outer shell is formed of a different material.

8. The system according to claim 2, wherein the cooling jacket comprises a first semi-circular segment having ends abutted to end of a second semi-circular segment to form a continuous annular structure.

9. The cooling system according to claim 8, wherein each of the first and second semi-circular segments comprises a pair of vertical end plates extending between the inner and outer shells arranged at opposing sides of each segment, the end plates the first semi-circular segment abutting the end plates of the second semi-circular segment at a flat-to-flat interface.

10. The system according to claim 1, wherein the cooling jacket has a height which extends for at least a majority of a height of the cask.

11. The system according to claim 1, further comprising a plurality of circumferentially spaced apart stiffening plates arranged in the cooling medium cavity of the cooling jacket and extending longitudinally and in a radial direction between the inner and outer shells, the stiffening plates extending for a majority of a height of the inner and outer shells to divide the cooling medium cavity into a plurality of cooling compartments each configured for holding the cooling medium.

12. The system according to claim 1, wherein the cooling medium is a solid substance having a triple point at a pressure which is greater than normal atmospheric pressure such that the cooling medium sublimates at normal atmospheric pressure inside the cooling jacket.

13. The system according to claim 12, wherein the cooling medium is dry ice.

14. The system according to claim 13, wherein the dry ice is in pellet or block form.

15. The system according to claim 1, wherein the cooling jacket is removably mounted to the cask.

16. The system according to claim 15, wherein the cooling jacket further comprises a plurality of hangers extending upwards from a top end of the cooling jacket and having a hook shape configured to hang the cooling jacket from a top surface of the cask in a suspended manner.

17. The cooling system according to claim 16, wherein the hangers comprise L-shaped brackets including a vertical section fixedly attached to the top end of the cooling jacket and a horizontal section extending inwards beyond an innermost surface of the cooling jacket to engage a peripheral top mounting flange of the cask.

18. The system according to claim 1, further comprising a circumferentially-extending insulation jacket disposed on an external surface of the cooling jacket.

19. The system according to claim 1, wherein the cooling jacket further comprises a plurality of circumferentially spaced apart spacers arranged on an internal surface of the cooling jacket, the spacers maintaining an empty annular interstitial space between the cooling jacket and the cask to allow some of the heat emitted from the cask to be removed by cooling air flow.

20. The system according to claim 19, wherein the spacers comprising a first circular array of block-shaped spacers arranged on an upper half of the internal surface of the cooling jacket, and a separate second circular array of block-shaped spacers arranged on a lower half of the internal surface of the cooling jacket.

21. The system according to claim 1, further comprising a canister loaded with the high level radioactive waste, the canister positioned within the storage cavity of the cask.

* * * * *